US011942043B2

(12) United States Patent
Yoon et al.

(10) Patent No.: US 11,942,043 B2
(45) Date of Patent: *Mar. 26, 2024

(54) DISPLAY DEVICE HAVING VARIED DRIVING FREQUENCY IN THE BOUNDARY REGION AND DRIVING METHOD THEREOF

(71) Applicant: Samsung Display Co., Ltd., Yongin-si (KR)

(72) Inventors: Changnoh Yoon, Seoul (KR); Soon-Dong Kim, Osan-si (KR); Sangan Kwon, Cheonan-si (KR); Seungjae Lee, Suwon-si (KR); Junheyung Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,197

(22) Filed: Nov. 21, 2022

(65) Prior Publication Data

US 2023/0087545 A1 Mar. 23, 2023

Related U.S. Application Data

(63) Continuation of application No. 17/326,570, filed on May 21, 2021, now Pat. No. 11,508,313.

(30) Foreign Application Priority Data

Sep. 8, 2020 (KR) ........................ 10-2020-0114918

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0278* (2013.01)

(58) Field of Classification Search
CPC .................................................... G09G 3/3275
(Continued)

(56) References Cited

U.S. PATENT DOCUMENTS 7,663,302 B2 2/2010 Shin et al.
9,633,608 B2 4/2017 Shin
(Continued)

FOREIGN PATENT DOCUMENTS

KR 100711890 B1 4/2007
KR 1020150069850 A 6/2015
(Continued)

*Primary Examiner* — Long D Pham
(74) *Attorney, Agent, or Firm* — CANTOR COLBURN LLP

(57) ABSTRACT

Provided is a display device. The display device includes a display panel including a plurality of pixels respectively connected to a plurality of data lines and a plurality of scan lines, a data driving circuit configured to drive the plurality of data lines, a scan driving circuit configured to drive the plurality of scan lines, and a driving controller configured to divide the display panel into a first display region and a second display region during a multi-frequency mode, and control the data driving circuit and the scan driving circuit so as to drive the first display region at a first driving frequency and drive the second display region at a second driving frequency lower than the first driving frequency, wherein, during the multi-frequency mode, the driving controller sets a frequency for each of horizontal lines in a boundary region, which is adjacent to the first display region, in the second display region to a third driving frequency between the first driving frequency and the second driving frequency.

19 Claims, 26 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 10,685,614 | B2 | 6/2020 | Mori et al. | |
| 2011/0032231 | A1* | 2/2011 | Maruyama | G09G 3/2096 345/208 |
| 2020/0098312 | A1 | 3/2020 | Cho et al. | |
| 2020/0388228 | A1 | 12/2020 | Oh et al. | |
| 2021/0027700 | A1 | 1/2021 | Chun et al. | |
| 2021/0027720 | A1 | 1/2021 | Park et al. | |
| 2021/0035524 | A1* | 2/2021 | Chun | G06T 3/40 |

FOREIGN PATENT DOCUMENTS

| | | | |
|---|---|---|---|
| KR | 1020170108840 | A | 9/2017 |
| KR | 1020210013485 | A | 2/2021 |

* cited by examiner

| Line # | f(Hz) |
|---|---|
| L1 | 60 |
| ⋮ | ⋮ |
| Lk | 60 |
| Lk+1 | 58 |
| Lk+2 | 56 |
| Lk+3 | 52 |
| Lk+4 | 48 |
| Lk+5 | 44 |
| Lk+6 | 40 |
| Lk+7 | 36 |
| Lk+8 | 32 |
| Lk+9 | 28 |
| Lk+10 | 24 |
| Lk+11 | 20 |
| Lk+12 | 16 |
| Lk+13 | 12 |
| Lk+14 | 8 |
| Lk+15 | 4 |
| Lk+16 | 2 |
| ⋮ | ⋮ |
| Ln | 1 |

FIG. 10A

| | | | Frame # | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| 0 | Line # | f(Hz) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 1 | Lk+1 | 58 | D | M | D | D | D | D | D | D | D | D | D | D | D | D | D | D | D | D | D | D | D | D | D | D | D | D | D | D | D | D | D |
| 2 | Lk+2 | 56 | D | M | M | D | D | D | D | D | D | D | D | D | D | D | D | D | D | D | D | D | D | D | D | D | D | D | D | D | D | D | D |
| 3 | Lk+3 | 52 | D | M | M | M | M | D | D | D | D | D | D | D | D | D | D | D | D | D | D | D | D | D | D | D | D | D | D | D | D | D | D |
| 4 | Lk+4 | 48 | D | M | M | M | M | M | M | D | D | D | D | D | D | D | D | D | D | D | D | D | D | D | D | D | D | D | D | D | D | D | D |
| 5 | Lk+5 | 44 | D | M | M | M | M | M | M | M | M | D | D | D | D | D | D | D | D | D | D | D | D | D | D | D | D | D | D | D | D | D | D |
| 6 | Lk+6 | 40 | D | M | M | M | M | M | M | M | M | M | M | D | D | D | D | D | D | D | D | D | D | D | D | D | D | D | D | D | D | D | D |
| 7 | Lk+7 | 36 | D | M | M | M | M | M | M | M | M | M | M | M | M | D | D | D | D | D | D | D | D | D | D | D | D | D | D | D | D | D | D |
| 8 | Lk+8 | 32 | D | M | M | M | M | M | M | M | M | M | M | M | M | M | M | D | D | D | D | D | D | D | D | D | D | D | D | D | D | D | D |
| 9 | Lk+9 | 28 | D | M | M | M | M | M | M | M | M | M | M | M | M | M | M | M | M | D | D | D | D | D | D | D | D | D | D | D | D | D | D |
| 10 | Lk+10 | 24 | D | M | M | M | M | M | M | M | M | M | M | M | M | M | M | M | M | M | M | D | D | D | D | D | D | D | D | D | D | D | D |
| 11 | Lk+11 | 20 | D | M | M | M | M | M | M | M | M | M | M | M | M | M | M | M | M | M | M | M | M | D | D | D | D | D | D | D | D | D | D |
| 12 | Lk+12 | 16 | D | M | M | M | M | M | M | M | M | M | M | M | M | M | M | M | M | M | M | M | M | M | M | D | D | D | D | D | D | D | D |
| 13 | Lk+13 | 12 | D | M | M | M | M | M | M | M | M | M | M | M | M | M | M | M | M | M | M | M | M | M | M | M | M | D | D | D | D | D | D |
| 14 | Lk+14 | 8 | D | M | M | M | M | M | M | M | M | M | M | M | M | M | M | M | M | M | M | M | M | M | M | M | M | M | M | D | D | D | D |
| 15 | Lk+15 | 4 | D | M | M | M | M | M | M | M | M | M | M | M | M | M | M | M | M | M | M | M | M | M | M | M | M | M | M | M | M | D | D |
| 16 | Lk+16 | 2 | D | M | M | M | M | M | M | M | M | M | M | M | M | M | M | M | M | M | M | M | M | M | M | M | M | M | M | M | M | M | D |

FIG. 10B

| Frame # | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
| D | D | D | D | D | D | D | D | D | D | D | D | D | D | D | D | D | D | D | D | D | D | D | D | D | D | D | D | M |
| D | D | D | D | D | D | D | D | D | D | D | D | D | D | D | D | D | D | D | D | D | D | D | D | D | D | D | M | M |
| D | D | D | D | D | D | D | D | D | D | D | D | D | D | D | D | D | D | D | D | D | D | D | D | D | M | M | M | M |
| D | D | D | D | D | D | D | D | D | D | D | D | D | D | D | D | D | D | D | D | D | D | D | M | M | M | M | M | M |
| D | D | D | D | D | D | D | D | D | D | D | D | D | D | D | D | D | D | D | D | D | M | M | M | M | M | M | M | M |
| D | D | D | D | D | D | D | D | D | D | D | D | D | D | D | D | D | D | D | M | M | M | M | M | M | M | M | M | M |
| D | D | D | D | D | D | D | D | D | D | D | D | D | D | D | D | D | M | M | M | M | M | M | M | M | M | M | M | M |
| D | D | D | D | D | D | D | D | D | D | D | D | D | D | D | M | M | M | M | M | M | M | M | M | M | M | M | M | M |
| D | D | D | D | D | D | D | D | D | D | D | D | D | M | M | M | M | M | M | M | M | M | M | M | M | M | M | M | M |
| D | D | D | D | D | D | D | D | D | D | D | M | M | M | M | M | M | M | M | M | M | M | M | M | M | M | M | M | M |
| D | D | D | D | D | D | D | D | D | M | M | M | M | M | M | M | M | M | M | M | M | M | M | M | M | M | M | M | M |
| D | D | D | D | D | D | D | M | M | M | M | M | M | M | M | M | M | M | M | M | M | M | M | M | M | M | M | M | M |
| D | D | D | D | D | M | M | M | M | M | M | M | M | M | M | M | M | M | M | M | M | M | M | M | M | M | M | M | M |
| D | D | D | M | M | M | M | M | M | M | M | M | M | M | M | M | M | M | M | M | M | M | M | M | M | M | M | M | M |
| D | M | M | M | M | M | M | M | M | M | M | M | M | M | M | M | M | M | M | M | M | M | M | M | M | M | M | M | M |
| M | M | M | M | M | M | M | M | M | M | M | M | M | M | M | M | M | M | M | M | M | M | M | M | M | M | M | M | M |

FIG. 14A

Frame #

| Line # | f(Hz) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| Lk+1 | 54 | D | M | M | M | M | M | M | D | D | D | D | D | D | D | D | D | D | D | D | D | D | D | D | D | D | D | D | D | D | D | D | D |
| Lk+2 | 48 | D | M | M | M | M | M | M | M | M | M | M | M | M | D | D | D | D | D | D | D | D | D | D | D | D | D | D | D | D | D | D | D |
| Lk+3 | 42 | D | M | M | M | M | M | M | M | M | M | M | M | M | M | M | M | M | M | M | D | D | D | D | D | D | D | D | D | D | D | D | D |
| Lk+4 | 35 | D | M | M | M | M | M | M | M | M | M | M | M | M | M | M | M | M | M | M | M | M | M | M | M | M | M | D | D | D | D | D | D |
| Lk+5 | 29 | D | M | M | M | M | M | M | M | M | M | M | M | M | M | M | M | M | M | M | M | M | M | M | M | M | M | M | M | M | M | M | M |
| Lk+6 | 23 | D | M | M | M | M | M | M | M | M | M | M | M | M | M | M | M | M | M | M | M | M | M | M | M | M | M | M | M | M | M | M | M |
| Lk+7 | 17 | D | M | M | M | M | M | M | M | M | M | M | M | M | M | M | M | M | M | M | M | M | M | M | M | M | M | M | M | M | M | M | M |
| Lk+8 | 13 | D | M | M | M | M | M | M | M | M | M | M | M | M | M | M | M | M | M | M | M | M | M | M | M | M | M | M | M | M | M | M | M |
| Lk+9 | 11 | D | M | M | M | M | M | M | M | M | M | M | M | M | M | M | M | M | M | M | M | M | M | M | M | M | M | M | M | M | M | M | M |
| Lk+10 | 9 | D | M | M | M | M | M | M | M | M | M | M | M | M | M | M | M | M | M | M | M | M | M | M | M | M | M | M | M | M | M | M | M |
| Lk+11 | 7 | D | M | M | M | M | M | M | M | M | M | M | M | M | M | M | M | M | M | M | M | M | M | M | M | M | M | M | M | M | M | M | M |
| Lk+12 | 6 | D | M | M | M | M | M | M | M | M | M | M | M | M | M | M | M | M | M | M | M | M | M | M | M | M | M | M | M | M | M | M | M |
| Lk+13 | 5 | D | M | M | M | M | M | M | M | M | M | M | M | M | M | M | M | M | M | M | M | M | M | M | M | M | M | M | M | M | M | M | M |
| Lk+14 | 4 | D | M | M | M | M | M | M | M | M | M | M | M | M | M | M | M | M | M | M | M | M | M | M | M | M | M | M | M | M | M | M | M |
| Lk+15 | 3 | D | M | M | M | M | M | M | M | M | M | M | M | M | M | M | M | M | M | M | M | M | M | M | M | M | M | M | M | M | M | M | M |
| Lk+16 | 2 | D | M | M | M | M | M | M | M | M | M | M | M | M | M | M | M | M | M | M | M | M | M | M | M | M | M | M | M | M | M | M | M |
| | | FB1 | | | | | | | FB2 | | | | | | FB3 | | | | | | FB4 | | | | | | | FB5 | | | | | |
| Fn | | 6 | 6 | 6 | 6 | 6 | 6 | 6 | 6 | 6 | 6 | 6 | 6 | 6 | 6 | 6 | 6 | 6 | 6 | 6 | 7 | 7 | 7 | 7 | 7 | 7 | 7 | 6 | 6 | 6 | 6 | 6 | 6 |

FIG. 17A

Frame #

| Line # | f(Hz) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|---|
| Lk+1 | 54 | D | M | M | M | M | M | M | D | D | D | D | D | D | D | D | D | D | D | D | D | D | D | D | D | D | D | D | D | D | D | D | D |
| Lk+2 | 48 | D | M | M | M | M | M | M | M | M | M | M | M | M | D | D | D | D | D | D | D | D | D | D | D | D | D | D | D | D | D | D | D |
| Lk+3 | 42 | D | M | M | M | M | M | M | M | M | M | M | M | M | M | M | M | M | M | M | D | D | D | D | D | D | D | D | D | D | D | D | D |
| Lk+4 | 35 | D | M | M | M | M | M | M | M | M | M | M | M | M | M | M | M | M | M | M | M | M | M | M | M | M | M | D | D | D | D | D | D |
| Lk+5 | 29 | D | M | M | M | M | M | M | M | M | M | M | M | M | M | M | M | M | M | M | M | M | M | M | M | M | M | M | M | M | M | M | M |
| Lk+6 | 23 | D | M | M | M | M | M | M | M | M | M | M | M | M | M | M | M | M | M | M | M | M | M | M | M | M | M | M | M | M | M | M | M |
| Lk+7 | 17 | D | M | M | M | M | M | M | M | M | M | M | M | M | M | M | M | M | M | M | M | M | M | M | M | M | M | M | M | M | M | M | M |
| Lk+8 | 13 | D | M | M | M | M | M | M | M | M | M | M | M | M | M | M | M | M | M | M | M | M | M | M | M | M | M | M | M | M | M | M | M |
| Lk+9 | 11 | D | M | M | M | M | M | M | M | M | M | M | M | M | M | M | M | M | M | M | M | M | M | M | M | M | M | M | M | M | M | M | M |
| Lk+10 | 9 | D | M | M | M | M | M | M | M | M | M | M | M | M | M | M | M | M | M | M | M | M | M | M | M | M | M | M | M | M | M | M | M |
| Lk+11 | 7 | D | M | M | M | M | M | M | M | M | M | M | M | M | M | M | M | M | M | M | M | M | M | M | M | M | M | M | M | M | M | M | M |
| Lk+12 | 6 | D | M | M | M | M | M | M | M | M | M | M | M | M | M | M | M | M | M | M | M | M | M | M | M | M | M | M | M | M | M | M | M |
| Lk+13 | 5 | D | M | M | M | M | M | M | M | M | M | M | M | M | M | M | M | M | M | M | M | M | M | M | M | M | M | M | M | M | M | M | M |
| Lk+14 | 4 | D | M | M | M | M | M | M | M | M | M | M | M | M | M | M | M | M | M | M | M | M | M | M | M | M | M | M | M | M | M | M | M |
| Lk+15 | 3 | D | M | M | M | M | M | M | M | M | M | M | M | M | M | M | M | M | M | M | M | M | M | M | M | M | M | M | M | M | M | M | M |
| Lk+16 | 2 | D | M | M | M | M | M | M | M | M | M | M | M | M | M | M | M | M | M | M | M | M | M | M | M | M | M | M | M | M | M | M | M |
| | | | FB1 | | | | | | FB2 | | | | | | FB3 | | | | | | FB4 | | | | | | | FB5 | | | | | |
| Fn | | | 6 | | | | | | | | | | | | | | | | | | 7 | | | | | | | 6 | | | | | |
| Fm | | | 2 | | | | | | | | | | | | | | | | | | 20 | | | | | | | 27 | | | | | |

FIG. 19A

| | | Frame # | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|
| Line # | f(Hz) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| Lk+1 | 54 | D | M | M | M | M | M | M | D | D | D | D | D | D | D | D | D | D | D | D | D | D | D | D | D | D | D | D | D | D | D | D | D |
| Lk+2 | 48 | D | M | M | M | M | M | M | M | M | M | M | M | M | D | D | D | D | D | D | D | D | D | D | D | D | D | D | D | D | D | D | D |
| Lk+3 | 42 | D | M | M | M | M | M | M | M | M | M | M | M | M | M | M | M | M | M | M | D | D | D | D | D | D | D | D | D | D | D | D | D |
| Lk+4 | 35 | D | M | M | M | M | M | M | M | M | M | M | M | M | M | M | M | M | M | M | M | M | M | M | M | M | M | D | D | D | D | D | D |
| Lk+5 | 29 | D | M | M | M | M | M | M | M | M | M | M | M | M | M | M | M | M | M | M | M | M | M | M | M | M | M | M | M | M | M | M | M |
| Lk+6 | 23 | D | M | M | M | M | M | M | M | M | M | M | M | M | M | M | M | M | M | M | M | M | M | M | M | M | M | M | M | M | M | M | M |
| Lk+7 | 17 | D | M | M | M | M | M | M | M | M | M | M | M | M | M | M | M | M | M | M | M | M | M | M | M | M | M | M | M | M | M | M | M |
| Lk+8 | 13 | D | M | M | M | M | M | M | M | M | M | M | M | M | M | M | M | M | M | M | M | M | M | M | M | M | M | M | M | M | M | M | M |
| Lk+9 | 11 | D | M | M | M | M | M | M | M | M | M | M | M | M | M | M | M | M | M | M | M | M | M | M | M | M | M | M | M | M | M | M | M |
| Lk+10 | 9 | D | M | M | M | M | M | M | M | M | M | M | M | M | M | M | M | M | M | M | M | M | M | M | M | M | M | M | M | M | M | M | M |
| Lk+11 | 7 | D | M | M | M | M | M | M | M | M | M | M | M | M | M | M | M | M | M | M | M | M | M | M | M | M | M | M | M | M | M | M | M |
| Lk+12 | 6 | D | M | M | M | M | M | M | M | M | M | M | M | M | M | M | M | M | M | M | M | M | M | M | M | M | M | M | M | M | M | M | M |
| Lk+13 | 5 | D | M | M | M | M | M | M | M | M | M | M | M | M | M | M | M | M | M | M | M | M | M | M | M | M | M | M | M | M | M | M | M |
| Lk+14 | 4 | D | M | M | M | M | M | M | M | M | M | M | M | M | M | M | M | M | M | M | M | M | M | M | M | M | M | M | M | M | M | M | M |
| Lk+15 | 3 | D | M | M | M | M | M | M | M | M | M | M | M | M | M | M | M | M | M | M | M | M | M | M | M | M | M | M | M | M | M | M | M |
| Lk+16 | 2 | D | M | M | M | M | M | M | M | M | M | M | M | M | M | M | M | M | M | M | M | M | M | M | M | M | M | M | M | M | M | M | M |

FB1 (frames 2–7), FB2 (frames 8–13), FB3 (frames 14–19), FB4 (frames 20–26), FB5 (frames 27–32)

| | Frame 2 | Frame 20 | Frame 27 |
|---|---|---|---|
| INT / AF | 6 | 7/6 | 6/7 |
| FM | | 20 | 27 |

AF

INT

FM

DISPLAY DEVICE HAVING VARIED DRIVING FREQUENCY IN THE BOUNDARY REGION AND DRIVING METHOD THEREOF

This application is a continuation of U.S. patent application Ser. No. 17/326,570, filed on May 21, 2021, which claims priority to Korean Patent Application No. 10-2020-0114918, filed on Sep. 8, 2020, and all the benefits accruing therefrom under 35 U.S.C. § 119, the content of which in its entirety is herein incorporated by reference.

BACKGROUND

1. Field

Embodiments of the invention herein relate to a display device.

2. Description of the Related Art

An organic light-emitting diode display device, among various types of display device, display images using an organic light-emitting diode which generates light through recombination of electrons and holes. Such organic light-emitting diode display devices are operated at low power while having a fast response time.

Organic light-emitting diode display devices are typically provided with pixels connected to data lines and scan lines. In general, the pixels include an organic light-emitting diode and a circuit unit for controlling the amount of current flowing to the organic light-emitting diode. The circuit unit controls the amount of current flowing from a first driving voltage to a second driving voltage via an organic light-emitting diode in response to a data signal. Here, light of predetermined brightness is generated based on the amount of current flowing through the organic light-emitting diode.

Since the field of application of display devices has been recently broadened, a plurality of different images may be displayed on a single display device.

SUMMARY

The disclosure provides a display device in which power consumption is reduced and deterioration of display quality is prevented, and a driving method of the display device.

An embodiment of the invention provides a display device including a display panel including a plurality of pixels connected to a plurality of data lines and a plurality of scan lines, a data driving circuit which drives the plurality of data lines, a scan driving circuit which drives the plurality of scan lines, and a driving controller which divides the display panel into a first display region and a second display region, controls the data driving circuit and the scan driving circuit to drive the first display region at a first driving frequency and to drive the second display region at a second driving frequency lower than the first driving frequency during a multi-frequency mode, and sets plurality of third driving frequencies respectively corresponding to a plurality of horizontal lines in a boundary region during the multi-frequency mode. In such an embodiment, each of the plurality of third driving frequencies has a frequency level between the first driving frequency and the second driving frequency, and the boundary region is defined by a portion of the second display region adjacent to the first display region.

In an embodiment, the plurality of horizontal lines in the boundary region may include H horizontal lines including a first horizontal line to an H-th horizontal line sequentially arranged from a position adjacent to the first display region, where H is a natural number.

In an embodiment, frequency levels of the plurality of third driving frequencies may nonlinearly decrease from the first horizontal line to the H-th horizontal line.

In an embodiment, a difference between the third driving frequencies corresponding to first and second horizontal lines among the H horizontal lines may be higher than a difference between the third driving frequencies corresponding to (H−1)-th and H-th horizontal lines among the H horizontal lines.

In an embodiment, the driving controller may drive or mask each of the H horizontal lines every A frames during the multi-frequency mode, where A is a natural number.

In an embodiment, the driving controller may mask each of the H horizontal lines during M frames among the A frames, and drive each of the H horizontal lines during (A-M) frames, where M is a natural number less than A.

In an embodiment, a value of M may nonlinearly increase from the first horizontal line to the H-th horizontal line.

In an embodiment, a number of masked frames of the first horizontal line among the H horizontal lines may be greater than a number of masked frames of the H-th horizontal line.

In an embodiment, the driving controller may include a frequency mode determination part which determines an operation mode based on an image signal and a control signal, and outputs a mode signal corresponding to the determined operation mode, a boundary controller which outputs a boundary masking signal when the mode signal indicates the multi-frequency mode, and a signal generator which outputs a data control signal and a scan control signal based on the image signal, the control signal, the mode signal, and the boundary masking signal, where the data control signal may be provided to the data driving circuit, and the scan control signal may be provided to the scan driving circuit.

In an embodiment, the boundary controller may include a memory defines, as a frame block, M consecutive frames in the H horizontal lines, and store a value of M corresponding to each fame block.

In an embodiment, the boundary controller may include a memory defines, as a frame block, M consecutive frames in the H horizontal lines, and store a value of M and a mask change frame indicating a frame block location in which the value of M is changed.

In an embodiment, the boundary controller may include a memory defines, as a frame block, M consecutive frames in the H horizontal lines, and store a mask change frame indicating a frame block location in which a value of M is changed and an acceleration factor indicating a ratio between a previous value of M and a current value of M at the frame block location.

In an embodiment of the invention, a display device includes a display panel in which a first non-folding region, a folding region, and a second non-folding region are defined in a plan view, where the display panel includes a plurality of pixels connected to a plurality of data lines and a plurality of scan lines, a data driving circuit which drives the plurality of data lines, a scan driving circuit which drives the plurality of scan lines, and a driving controller which divides the display panel into a first display region and a second display region, and controls the data driving circuit and the scan driving circuit to drive the first display region at a first driving frequency and to drive the second display region at a second driving frequency lower than the first driving frequency, and sets a plurality of third driving frequencies respectively corresponding to a plurality of horizontal lines in a boundary region during a multi-frequency mode. In such an embodiment, each of the plurality of third driving frequencies has frequency level between the first driving frequency and the second driving frequency, and the boundary region is defined by a portion of the second display region adjacent to the first display region.

In an embodiment, the boundary region may include H horizontal lines including a first horizontal line to an H-th horizontal line sequentially arranged from a position adjacent to the first display region, where H is a natural number.

In an embodiment, frequency levels of the plurality of third driving frequencies may nonlinearly decrease from the first horizontal line to the H-th horizontal line.

In an embodiment, the driving controller may drive or mask each of the H horizontal lines every A frames during the multi-frequency mode, where A is a natural number.

In an embodiment, the driving controller may mask each of the H horizontal lines during M frames among the A frames, and drive each of the H horizontal lines during (A-M) frames, where M is a natural number less than A.

In an embodiment of the invention, a method of driving a display device includes dividing a display panel of the display device into a first display region and a second display region, and driving the first display region at a first driving frequency and driving the second display region at a second driving frequency lower than the first driving frequency during a multi-frequency mode, and setting a plurality of third driving frequencies respectively corresponding to a plurality of horizontal lines in a boundary region during the multi-frequency mode, where each of the plurality of third driving frequencies has a frequency level between the first driving frequency and the second driving frequency, and the boundary region is defined by a portion of the second display region adjacent to the first display region.

In an embodiment, the boundary region may include H horizontal lines including a first horizontal line to an H-th horizontal line sequentially arranged from a position adjacent to the first display region, where H is a natural number, and the setting the plurality of third driving frequencies respectively corresponding to the plurality of horizontal lines in the boundary region comprises masking each of the H horizontal lines during M frames among A frames, and driving each of the H horizontal lines during (A-M) frames among the A frames, where M is a natural number, and A is a natural number greater than M.

In an embodiment, frequency levels of the plurality of third driving frequencies may nonlinearly decrease from the first horizontal line to the H-th horizontal line.

In an embodiment, a value of M may nonlinearly increase from the first horizontal line to the H-th horizontal line.

BRIEF DESCRIPTION OF THE DRAWINGS

The above and other features of the invention will become more apparent by describing in further detail embodiments thereof with reference to the accompanying drawings, in which:

FIGS. 10A and 10B are diagrams illustrating an embodiment of a method of driving horizontal lines of a boundary region;

FIGS. 14A and 14B are diagrams illustrating an embodiment of a method of driving horizontal lines of a boundary region;

FIGS. 17A and 17B are diagrams illustrating an alternative embodiment of a method of driving horizontal lines of a boundary region;

FIGS. 19A and 19B are diagrams illustrating another alternative embodiment of a method of driving horizontal lines of a boundary region.

DETAILED DESCRIPTION

Figure 1:
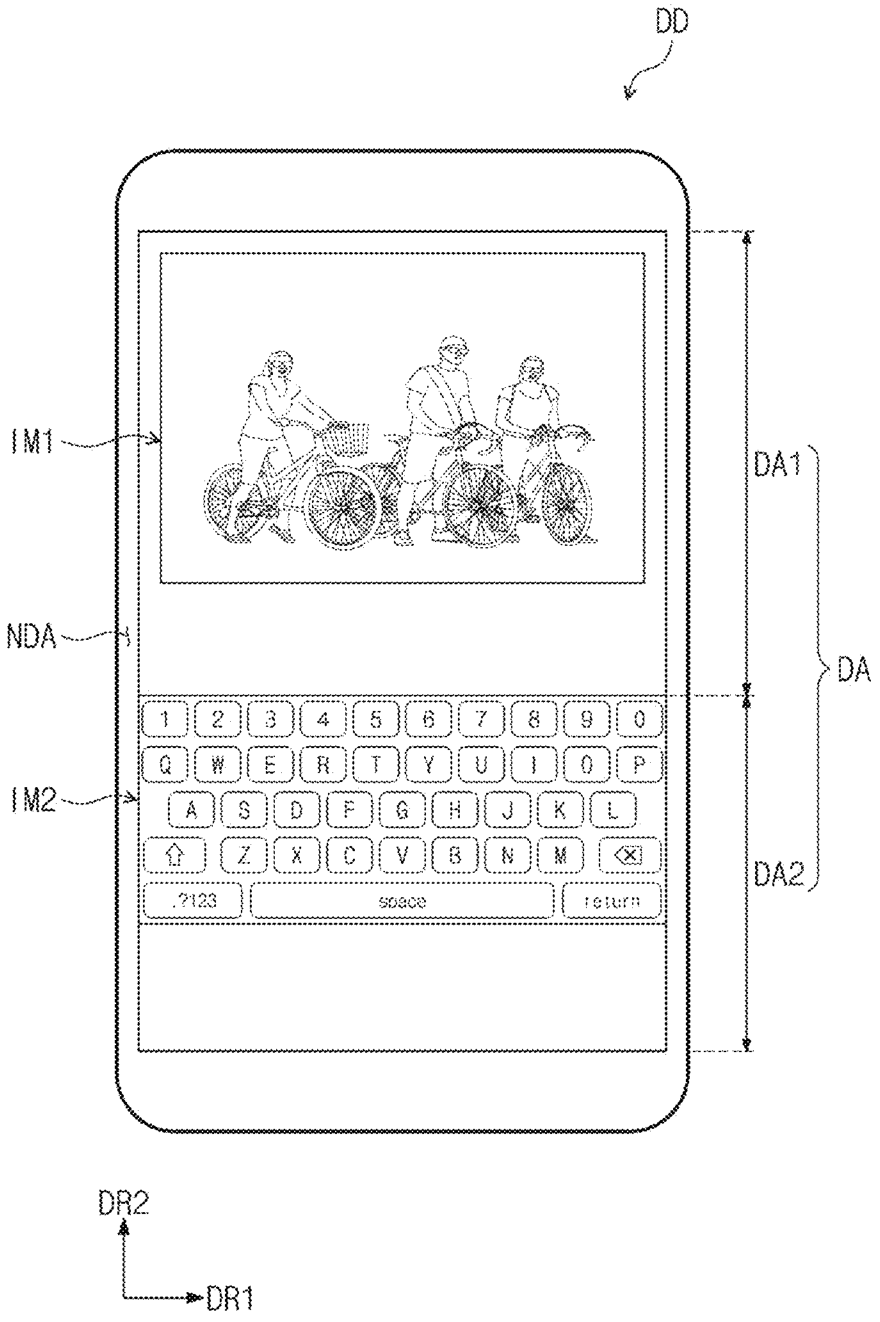
FIG. 1 is a perspective view of an embodiment of a display device according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element (or a region, layer, portion, or the like) is referred to as being "on", "connected to", or "coupled to" another element, it can be directly on or directly connected/coupled to the other element, or a third element may be present therebetween.

The same reference numerals refer to the same elements. In the drawings, the thicknesses, ratios, and dimensions of elements are exaggerated for clarity of illustration. As used herein, the term "and/or" includes any combinations that can be defined by associated elements.

The terms "first", "second" and the like may be used for describing various elements, but the elements should not be construed as being limited by the terms. Such terms are only used for distinguishing one element from other elements. For example, a first element could be termed a second element and vice versa without departing from the teachings of the present disclosure. The terms of a singular form may include plural forms unless otherwise specified.

Furthermore, the terms "under", "lower side", "on", "upper side", and the like are used to describe association relationships among elements illustrated in the drawings. The terms, which are relative concepts, are used on the basis of directions illustrated in the drawings.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "include", "including", "has", "having", and the like, when used in this specification, specify the presence of stated features, numbers, steps, operations, elements, components, or combinations thereof, but do not preclude the presence or addition of one or more other features, numbers, steps, operations, elements, components, or combinations thereof.

All of the terms used herein (including technical and scientific terms) have the same meanings as understood by those skilled in the art, unless otherwise defined. Terms in common usage such as those defined in commonly used dictionaries should be interpreted to contextually match the meanings in the relevant art, and are explicitly defined herein unless interpreted in an idealized or overly formal sense.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a perspective view illustrating a display device DD according to the invention.

FIG. 1 illustrates a portable terminal as an example of a display device DD according to the invention. The portable terminal may include a tablet personal computer ("PC"), a smartphone, a personal digital assistant ("PDA"), a portable multimedia player ("PMP"), a game machine, a wrist watch-type electronic device, etc. However, the invention is not limited thereto. An embodiment of the inventive concept may be used not only in large-size electronic devices such as an outdoor billboard but also in small- and medium-size electronic devices such as a personal computer, a laptop computer, a kiosk, a vehicle navigation unit, and a camera. However, these devices are merely examples, and thus embodiments of the invention may be applied to other electronic devices without departing from the spirit of the invention described herein.

In an embodiment, as illustrated in FIG. 1, a display surface on which a first image IM1 and a second image IM2 are displayed is parallel to a surface defined by a first direction DR1 and a second direction DR2. The display device DD includes a plurality of regions divided on the display surface. The display surface includes a display region DA in which the first image IM1 and the second image IM2 are displayed and a non-display region NDA adjacent to the display region DA. The non-display region NDA may be referred to as a bezel region. In one embodiment, for example, the display region DA may be rectangular. The non-display region NDA surrounds the display region DA. In one alternative embodiment, for example, the display device DD may include a partially curved shape. In such an embodiment, one region of the display region DA may have a curved shape.

The display region DA of the display device DD includes a first display region DA1 and a second display region DA2. In a specific application program, the first image IM1 may be displayed in the first display region DA1, and the second image IM2 may be displayed in the second display region DA2. In one embodiment, for example, the first image IM1 may be a moving image, and the second image IM2 may be a still image or text information having a long change period.

In an embodiment, the display device DD may drive the first display region DA1, in which a moving image is displayed, at a normal frequency, and drive the second display region DA2, in which a still image is displayed, at a low frequency that is lower than the normal frequency. The display device DD may reduce power consumption by decreasing a driving frequency of the second display region DA2.

Sizes of the first display region DA1 and the second display region DA2 may be preset and may be changed by an application program. In an embodiment, when the first display region DA1 displays a still image, and the second display region DA2 displays a moving image, the first display region DA1 may be driven at a low frequency, and the second display region DA2 may be driven at a normal frequency. In an embodiment, the display region DA may be divided into three or more display regions, and a driving frequency of each of the display regions may be determined according to the type of an image (still image or moving image) displayed in each of the display regions.

Figure 2A:
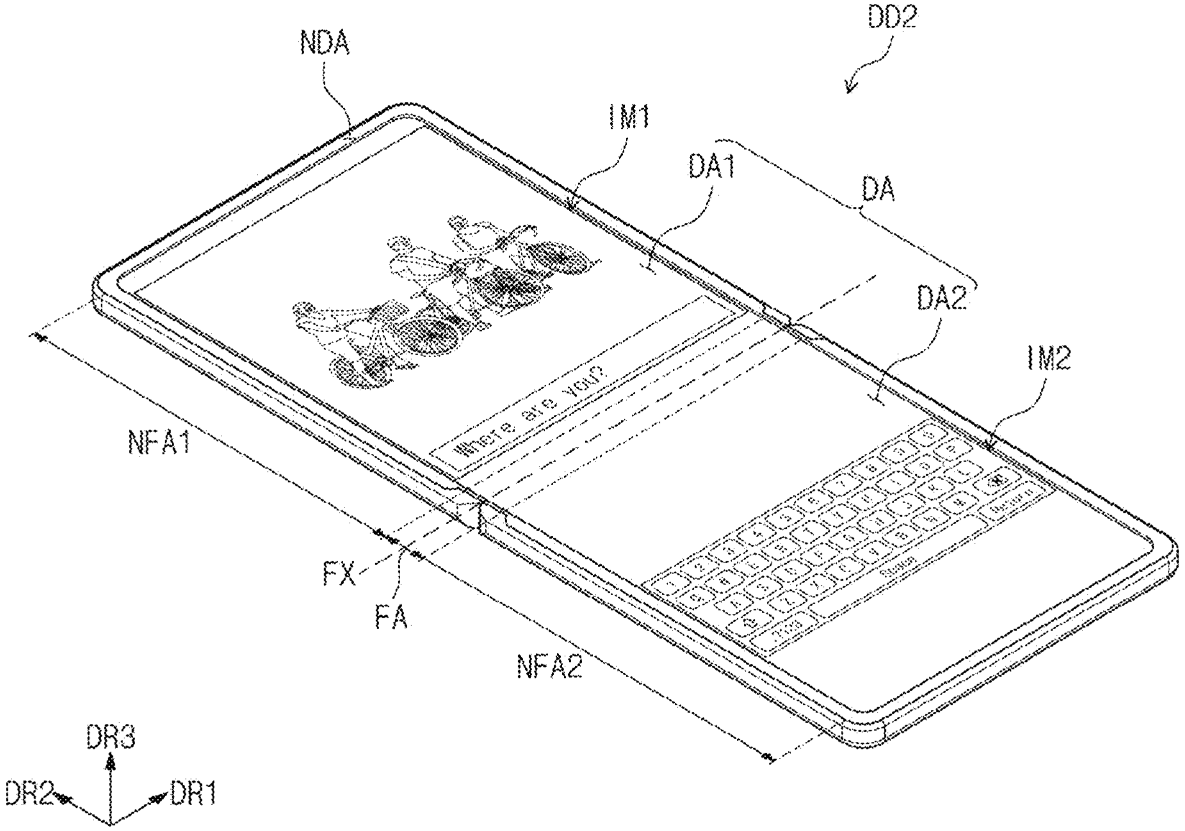
FIGS. 2A and 2B are perspective views an embodiment of a display device according to the invention.
Figure 2B:
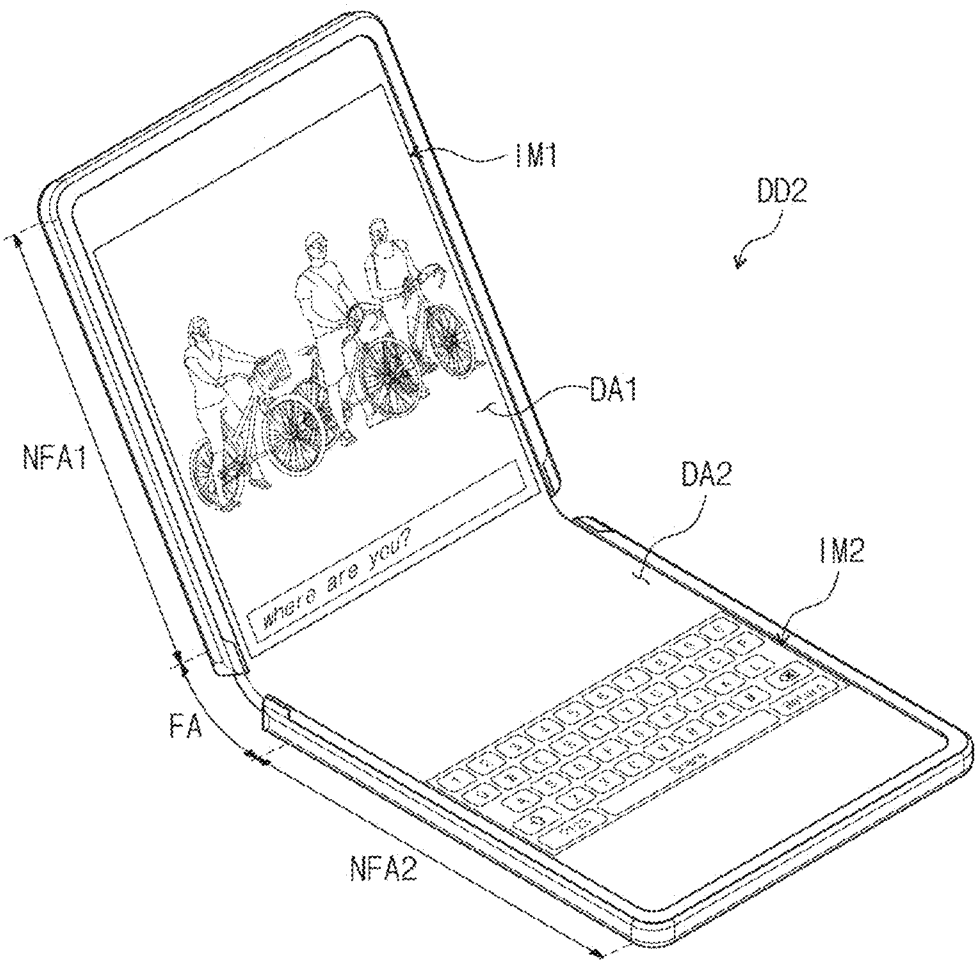

FIGS. 2A and 2B are perspective views illustrating a display device DD2 according to an embodiment of the invention. FIG. 2A illustrates the display device DD2 in an unfolded state, and FIG. 2B illustrates the display device DD2 in a folded state.

In an embodiment, as illustrated in FIGS. 2A and 2B, the display device DD2 includes the display region DA and the non-display region NDA. The display device DD2 may display an image through the display region DA. When the display device DD2 is unfolded, the display region DA may include a plane defined by the first direction DR1 and the second direction DR2. A thickness direction of the display device DD2 may be parallel with a third direction DR3 intersecting with the first direction DR1 and the second direction DR2. Therefore, front surfaces (or top surfaces)

and rear surfaces (or bottom surfaces) of members constituting the display device DD2 may be defined based on the third direction DR3. The non-display region NDA may be referred to as a bezel region. In an embodiment, the display region DA may be rectangular. The non-display region NDA surrounds the display region DA.

The display region DA may include a first non-folding region NFA1, a folding region FA, and a second non-folding region NFA2. The folding region FA may be bent with respect to a folding axis FX extending in the first direction DR1.

When the display device DD2 is folded, the first non-folding region NFA1 and the second non-folding region NFA2 may face each other. Therefore, in a state in which the display device DD2 is completely folded, the display region DA may not be exposed to an outside, and this state may be referred to as in-folding state. However, this is merely an example, and operation of the display device DD2 is not limited thereto.

In an embodiment of the invention, when the display device DD2 is folded, the first non-folding region NFA1 and the second non-folding region NFA2 may oppose each other. Therefore, in a folded state, the first non-folding region NFA1 may be exposed to the outside, and this state may be referred to as out-folding state.

The display device DD2 may be configured to perform only one of an in-folding motion and an out-folding motion. Alternatively, the display device DD2 may be configured to perform both the in-folding motion and the out-folding motion. In such an embodiment, a same region in the display device DD2, for example, the folding region FA, may be in-folded and out-folded. Alternatively, a partial region of the display device DD2 may be in-folded, and another partial region of the display device DD2 may be out-folded.

FIGS. 2A and 2B illustrate an embodiment where one folding region and two non-folding regions are defined, but the number of folding regions and the number of non-folding regions are not limited thereto. In an alternative embodiment, the display device DD2 may include more than two non-folding regions and a plurality of folding regions arranged between adjacent non-folding regions.

FIGS. 2A and 2B illustrate an embodiment where the folding axis FX is parallel with a minor axis or a width direction of the display device DD2, but an embodiment of the invention is not limited thereto. In an alternative embodiment, the folding axis FX may extend in a direction parallel to a major axis or length direction of the display device DD2, for example, the second direction DR2. In such an embodiment, the first non-folding region NFA1, the folding region FA, and the second non-folding region NFA2 may be sequentially arranged in the first direction DR1.

The plurality of display regions DA1 and DA2 may be defined in the display region DA of the display device DD2. FIG. 2A illustrates an embodiment where two display regions DA1 and DA2 are defined, but the number of the plurality of display regions DA1 and DA2 is not limited thereto.

The plurality of display regions DA1 and DA2 may include a first display region DA1 and a second display region DA2. In an embodiment, the first display region DA1 may be a region in which the first image IM1 is displayed, and the second display region DA2 may be a region in which the second image IM2 is displayed, for example, but the invention is not limited thereto. In an embodiment, the first image IM1 may be a moving image, and the second image IM2 may be a still image or an image (text information or the like) having a long change period, for example.

In an embodiment, the display device DD2 may differently operate according to an operation mode. The operation mode may include a normal mode and a multi-frequency mode. During the normal mode, the display device DD2 may drive both of the first display region DA1 and the second display region DA2 at a normal frequency. During the multi-frequency mode, the display device DD2 may drive the first display region DA1, in which the first image IM1 is displayed, at a first driving frequency, and drive the second display region DA2, in which the second image IM2 is displayed, at a second driving frequency lower than the normal frequency. In an embodiment, the first driving frequency may be the same as the normal frequency. Power consumption of the display device DD2 may be reduced by decreasing a driving frequency of the second display region DA2 during the multi-frequency mode. Therefore, the multi-frequency mode may also be referred to as a low-power mode.

Sizes of the first display region DA1 and the second display region DA2 may be preset and may be changed by an application program. In an embodiment, the first display region DA1 may correspond to the first non-folding region NFA1, and the second display region DA2 may correspond to the second non-folding region NFA2. In an embodiment, a first portion of the folding region FA may correspond to the first display region DA1, and a second portion of the folding region FA may correspond to the second display region DA2.

In an embodiment, an entirety of the folding region FA may correspond to only one of the first display region DA1 and the second display region DA2.

In an embodiment, the first display region DA1 may correspond to a first portion of the first non-folding region NFA1, and the second display region DA2 may correspond to a second portion of the first non-folding region NFA1, the folding region FA, and the second non-folding region NFA2. That is, an area of the first display region DA1 may be less than an area of the second display region DA2.

In an embodiment, the first display region DA1 may correspond to the first non-folding region NFA1, the folding region FA, and a first portion of the second non-folding region NFA2, and the second display region DA2 may correspond to a second portion of the second non-folding region NFA2. That is, the area of the second display region DA2 may be less than the area of the first display region DA1.

In an embodiment, as illustrated in FIG. 2B, when the folding region FA is in a folded state, the first display region DA1 may correspond to the first non-folding region NFA1, and the second display region DA2 may correspond to the folding region FA and the second non-folding region NFA2.

FIGS. 2A and 2B illustrate an embodiment where the display device DD2 includes a single folding region, but an embodiment of the invention is not limited thereto. In an embodiment of the invention, the display device DD2 may also be applied to a display device including two or more folding regions, a multi-surface display device including two or more display surfaces, a rollable display device, a slidable display device, or the like.

In an embodiment, a multi-surface display device including two or more display surfaces, a rollable display device, or a slidable display device may drive a viewing area, through which an image is displayed to a user, at the first driving frequency, and may drive an un-viewing area, which is not displayed to the user, at the second driving frequency lower than the normal frequency.

For convenience of description, embodiments of the display device DD illustrated in FIG. 1 will hereinafter be described in detail, but the following descriptions may also be applied to embodiments of the display device DD2 illustrated in FIGS. 2A and 2B.

Figure 3A:
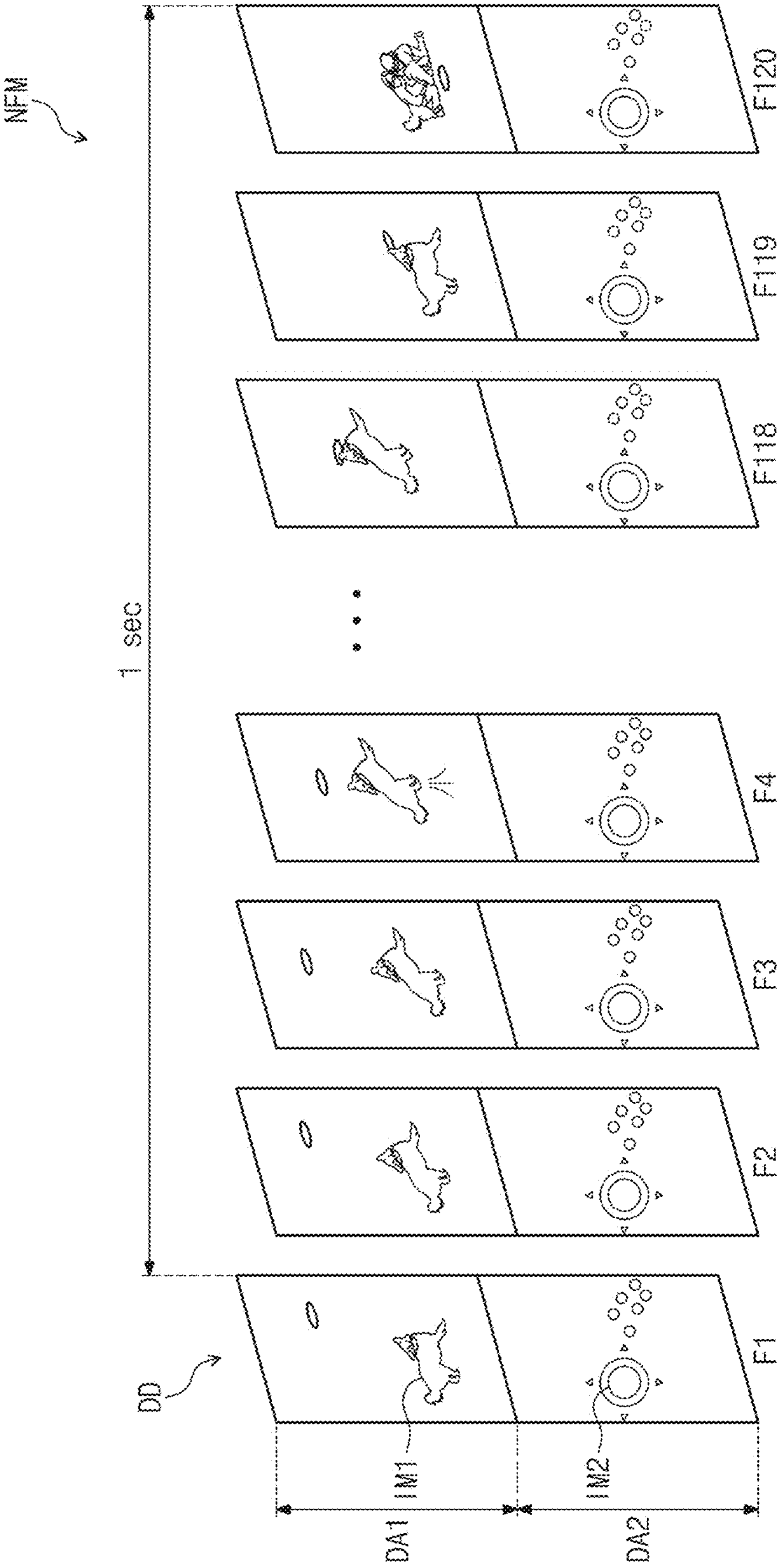
FIG. 3A is a drawing for describing an embodiment of an operation of a display device in a normal mode.
Figure 3B:
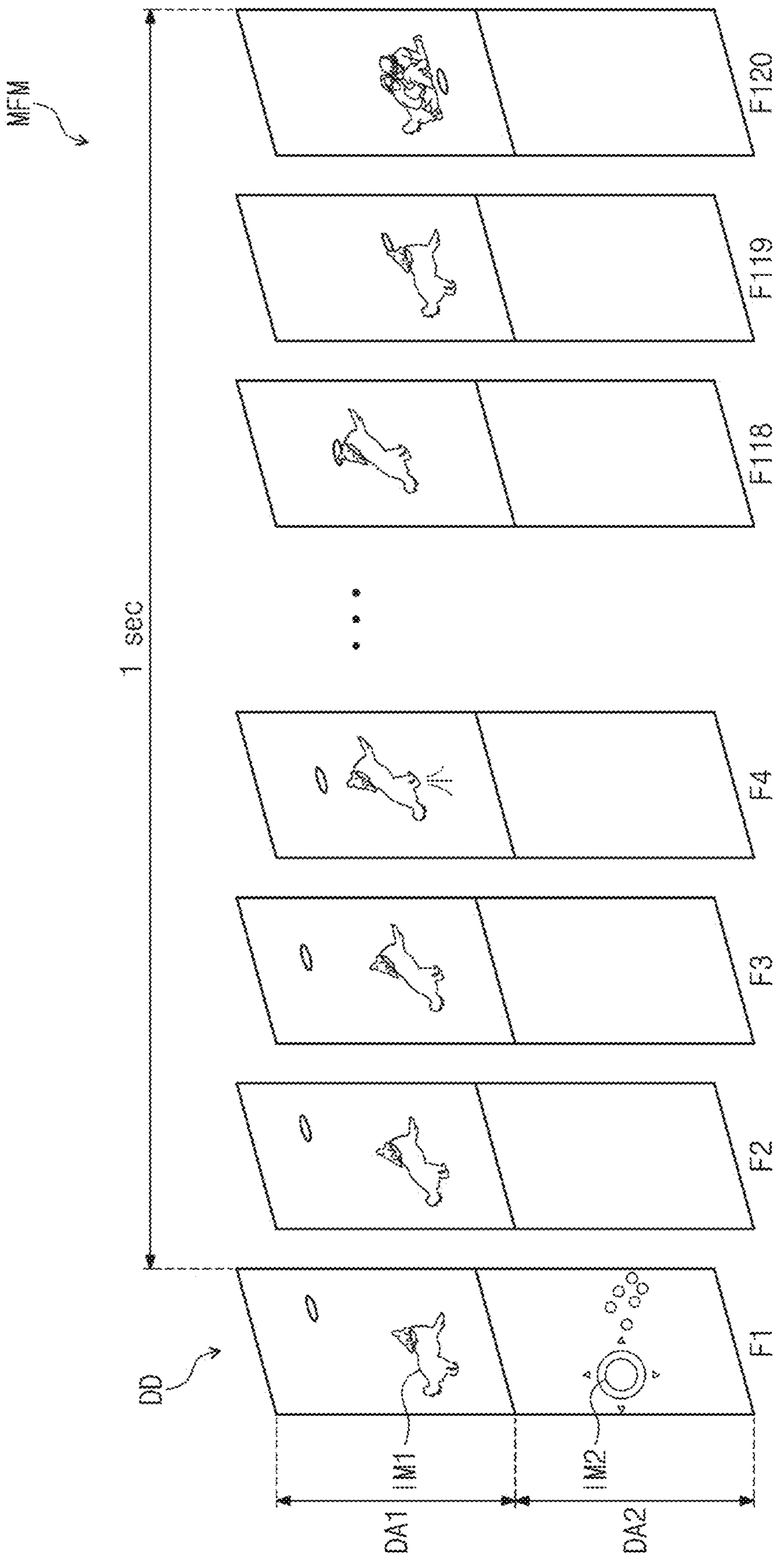
FIG. 3B is a drawing for describing an embodiment of an operation of a display device in a multi-frequency mode.

FIG. 3A is a diagram for describing an embodiment of an operation of a display device DD at a normal mode NFM. FIG. 3B is a diagram for describing an embodiment of an operation of a display device DD at a multi-frequency mode MFM.

Referring to FIG. 3A, the first image IM1 displayed in the first display region DA1 may be a moving image, and the second image IM2 displayed in the second display region DA2 may be a still image or an image having a long change period (e.g., a game operating keypad). The first image IM1 displayed in the first display region DA1 and the second image IM2 displayed in the second display region DA2, illustrated in FIG. 1, are merely examples, and various images may be displayed on the display device DD.

In a normal mode NFM, the driving frequency of each of the first display region DA1 and the second display region DA2 of the display device DD is a normal frequency. In one embodiment, for example, the normal frequency may be 120 hertz (Hz). In the normal mode NFM, images of a first frame F1 to 120-th frame F120 may be displayed during one second in the first display region DA1 and the second display region DA2 of the display device DD.

Referring to FIG. 3B, in a multi-frequency mode MFM, the display device DD may set, to a first driving frequency, the driving frequency of the first display region DA1, in which the first image IM1, i.e., a moving image, is displayed, and may set, to a second driving frequency lower than the first driving frequency, the driving frequency of the second display region DA2, in which the second image IM2, i.e., a still image, is displayed. In an embodiment where the normal frequency is 120 Hz, the first driving frequency may be 120 Hz, and the second driving frequency may be 1 Hz. The first driving frequency and the second driving frequency may be variously changed. In one embodiment, for example, the first driving frequency may be 144 Hz that is higher than the normal frequency, and the second driving frequency may be one selected from 120 Hz, 30 Hz, and 10 Hz that are lower than the normal frequency.

In an embodiment where the first driving frequency is 120 Hz and the second driving frequency is 1 Hz in the multi-frequency mode MFM, the first image IM1 is displayed in each of the first frame F1 to 120-th frame F120 in the first display region DA1 of the display device DD during one second. In the second display region DA2, the second image IM2 may be displayed only in the first frame F1 and may not be displayed in the other frames F2 to F120. Operation of the display device DD in the multi-frequency mode MFM will be described in greater detail later.

Figure 4:
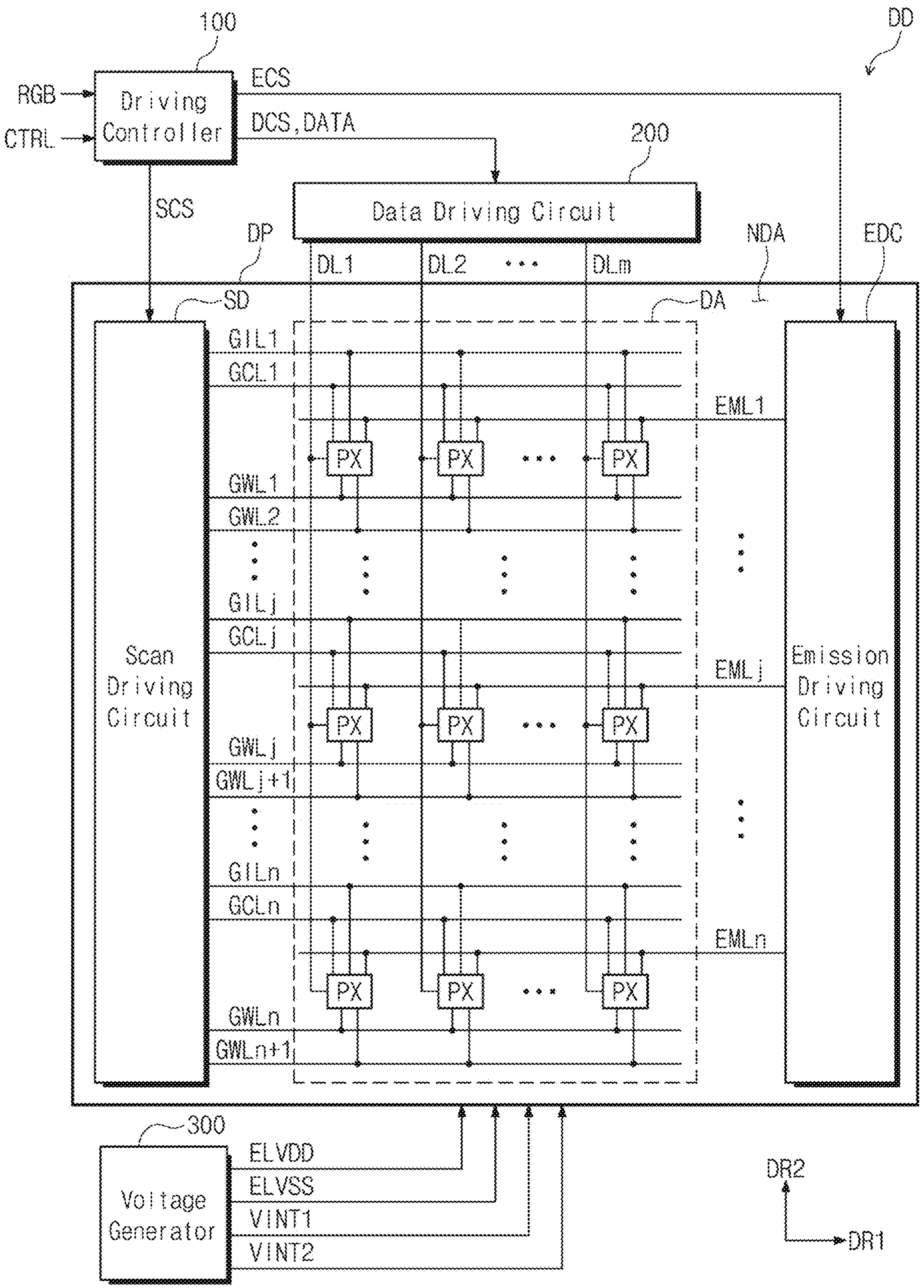
FIG. 4 is a block diagram an embodiment of a display device according to the invention.

FIG. 4 is a block diagram illustrating a display device according to an embodiment of the invention.

Referring to FIG. 4, an embodiment of the display device DD includes a display panel DP, a driving controller 100, a data driving circuit 200, and a voltage generator 300.

The driving controller 100 receives an image signal RGB and a control signal CTRL. The driving controller 100 generates image data signal DATA by converting a data format of the image signal RGB so that the image signal RGB is compatible with a specification of interface with the data driving circuit 200. The driving controller 100 outputs a scan control signal SCS, a data control signal DCS, and an emission control signal ECS.

The data driving circuit 200 receives the data control signal DCS and the image data signal DATA from the driving controller 100. The data driving circuit 200 converts the image data signal DATA into data signals, and outputs the data signals to a plurality of data lines DL1 to DLm that will be described later. The data signals are analog voltages corresponding to gradation values of the image data signal DATA.

The voltage generator 300 generates voltages used for operating the display panel DP. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, data lines DL1 to DLm, and pixels PX. The display panel DP may further include a scan driving circuit SD and an emission driving circuit EDC. In an embodiment, the scan driving circuit SD is arranged on a first side of the display panel DP. The scan lines GIL1 to GILn, GCL1 to GCLn, and GWL1 to GWLn+1 may extend from the scan driving circuit SD in the first direction DR1.

The emission driving circuit EDC is arranged on a second side of the display panel DP. The emission control lines EML1 to EMLn extend from the emission driving circuit EDC in an opposite direction to the first direction DR1.

The scan lines GIL1 to GILn, GCL1 to GCLn, and GWL1 to GWLn+1 and the emission control lines EML1 to EMLn are arranged spaced apart from each other in the second direction DR2. The data lines DL1 to DLm extend from the data driving circuit 200 in an opposite direction to the second direction DR2, and are arranged spaced apart from each other in the first direction DR1.

In an embodiment, as illustrated in FIG. 4, the scan driving circuit SD and the emission driving circuit EDC face each other with the pixels PX therebetween, but an embodiment of the invention is not limited thereto. In one alternative embodiment, for example, the scan driving circuit SD and the emission driving circuit EDC may be arranged adjacent to each other on the first side or the second side of the display panel DP. In an embodiment, the scan driving circuit SD and the emission driving circuit EDC may be configured as one circuit or a single circuit chip.

The plurality of pixels PX are electrically connected to the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected to four scan lines and one emission control line. In one embodiment, for example, as illustrated in FIG. 4, pixels PX of a first row may be connected to the scan lines GIL1, GCL1, GWL1, and GWL2 and the emission control line EML1. In such an embodiment, pixels PX of a j-th row may be connected to the scan lines GILj, GCLj, GWLj and GWLj+1 and the emission control line EMLj.

Each of the plurality of pixels PX includes a light-emitting diode ED (see FIG. 5A) and a pixel circuit unit PXC (see FIG. 5A) for controlling the light-emitting diode ED. The pixel circuit unit PXC may include at least one transistor and at least one capacitor. The scan driving circuit SD and the emission driving circuit EDC may include transistors formed through a same process as the pixel circuit unit PXC.

Each of the plurality of pixels PX receives the first driving voltage ELVDD, the second driving voltage ELVSS, the first initialization voltage VINT1, and the second initialization voltage VINT2.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS. A circuit configuration and operation of the scan driving circuit SD will be described in detail later.

In an embodiment, the driving controller 100 may divide the display panel DP into the first display region DA1 (see FIG. 1) and the second display region DA2 (see FIG. 1) and set the driving frequency of each of the first display region DA1 and the second display region DA2 on the basis of the image signal RGB. In one embodiment, for example, the driving controller 100 drives each of the first display region DA1 and the second display region DA2 at a normal frequency (e.g., 120 Hz) in the normal mode. In the multi-frequency mode, the driving controller 100 may drive the first display region DA1 at a first driving frequency (e.g., 120 Hz) and the second display region DA2 at a low frequency (e.g., 1 Hz).

Figure 5A:
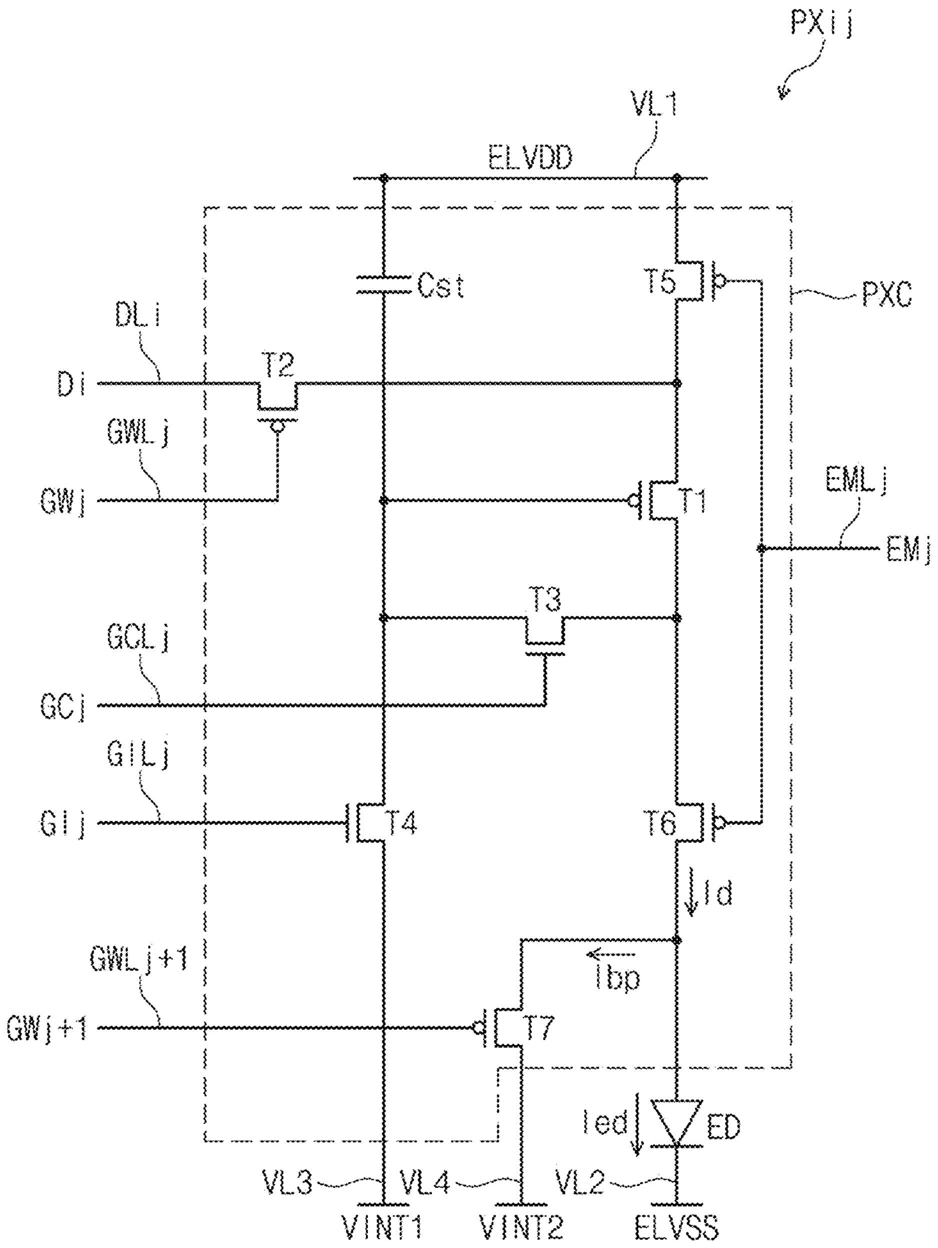
FIG. 5A is an equivalent circuit diagram of an embodiment of a pixel according to the invention.

FIG. 5A is an equivalent circuit diagram of an embodiment of a pixel PX according to the invention.

FIG. 5A illustrates an equivalent circuit diagram of an embodiment of a pixel PXij connected to an i-th data line DLi among the data lines DL1 to DLm illustrated in FIG. 4, j-th scan lines GILj, GCLj, and GWLj and (j+1)-th scan line GWLj+1 among the scan lines GIL1 to GILn, GCL1 to GCLn, and GWL1 to GWLn+1, and a j-th emission control line EMLj among the emission control lines EML1 to EMLn.

Each of the plurality of pixels PX illustrated in FIG. 4 may have a same circuit configuration as the equivalent circuit diagram of the pixel PXij illustrated in FIG. 5A. In an embodiment, in the pixel circuit unit PXC of the pixel PXij, third and fourth transistors T3 and T4 among first to seventh transistors T1 to T7 are N-type transistors having an oxide semiconductor as a semiconductor layer, and first, second, fifth, sixth, and seventh transistors T1, T2, T5, T6, and T7 are P-type transistors having a low-temperature polycrystalline silicon ("LTPS") semiconductor layer. However, an embodiment of the invention is not limited thereto, and alternatively, all of the first to seventh transistors T1 to T7 may be P-type transistors or N-type transistors. In another alternative embodiment, at least one of the first to seventh transistors T1 to T7 may be an N-type transistor, and the others may be P-type transistors. In embodiments, the circuit configuration of a pixel PXij is not limited to that illustrated in FIG. 5A. The pixel circuit unit PXC illustrated in FIG. 5A is merely an example, and the configuration of the pixel circuit unit PXC may be variously modified.

Referring to FIG. 5A, an embodiment of the pixel PXij of a display device DD may include the first to seventh transistors T1 to T7, a capacitor Cst, and a light-emitting diode ED. In one embodiment, for example, each pixel PXij includes a single light-emitting diode ED, as show in FIG. 5A.

The j-th scan lines GILj, GCLj, GWLj, and the (j+1)-th scan line GWLj+1 may respectively transfer scan signals GIj, GCj, GWj, and GWj+1, and the j-th emission control line EMLj may transfer an emission signal EMj. The i-th data line DLi transfers a data signal Di. The data signal Di may have a voltage level corresponding to the image signal RGB input to the display device DD (see FIG. 4). First to fourth driving voltage lines VL1, VL2, VL3, and VL4 may transfer the first driving voltage ELVDD, the second driving voltage ELVSS, the first initialization voltage VINT1, and the second initialization voltage VINT2, respectively.

The first transistor T1 includes a first electrode connected to the first driving voltage line VL1 via the fifth transistor T5, a second electrode electrically connected to an anode of the light-emitting diode ED via the sixth transistor T6, and a gate electrode connected to one end of the capacitor Cst. The first transistor T1 may receive the data signal Di transferred through the i-th data line DLi based on a switching operation of the second transistor T2 to supply a driving current Id to the light-emitting diode ED.

The second transistor T2 includes a first electrode connected to the i-th data line DLi, a second electrode connected to the first electrode of the first transistor T1, and a gate electrode connected to the j-th scan line GWLj. The second transistor T2 may be turned on in response to the j-th scan signal GWj received through the scan line GWLj to transfer, to the first electrode of the first transistor T1, the data signal Di received through the i-th data line DLi.

The third transistor T3 includes a first electrode connected to the gate electrode of the first transistor T1, a second electrode connected to the second electrode of the first transistor T1, and a gate electrode connected to the j-th scan line GCLj. The third transistor T3 may be turned on in response to the scan signal GCj received through the j-th scan line GCLj to connect the gate electrode and the second electrode of the first transistor T1 to each other to diode-connect the first transistor T1.

The fourth transistor T4 includes a first electrode connected to the gate electrode of the first transistor T1, a second electrode connected to the third driving voltage line VL3 through which the first initialization voltage VINT1 is transferred, and a gate electrode connected to the j-th scan line GILj. The fourth transistor T4 is turned on in response to the scan signal GIj received through the j-th scan line GILj, and transfers the first initialization voltage VINT1 to the gate electrode of the first transistor T1 to perform an initialization operation for initializing a voltage of the gate electrode of the first transistor T1.

The fifth transistor T5 includes a first electrode connected to the first driving voltage line VL1, a second electrode connected to the first electrode of the first transistor T1, and a gate electrode connected to the j-th emission control line EMLj.

The sixth transistor T6 includes a first electrode connected to the second electrode of the first transistor T1, a second electrode connected to the anode of the light-emitting diode ED, and a gate electrode connected to the j-th emission control line EMLj.

The fifth transistor T5 and the sixth transistor T6 may be simultaneously turned on in response to the emission signal EMj received through the j-th emission control line EMLj so that the first driving voltage ELVDD may be compensated through the diode-connected first transistor T1 and transferred to the light-emitting diode ED.

The seventh transistor T7 includes a first electrode connected to the second electrode of the sixth transistor T6, a second electrode connected to the fourth driving voltage line VL4, and a gate electrode connected to the (j+1)-th scan line GWLj+1. The seventh transistor T7 may be turned on in response to the scan signal GWj+1 received through the (j+1)-th scan line GWLj+1 to bypass a current of the anode of the light-emitting diode ED to the fourth driving voltage line VL4.

One end of the capacitor Cst is connected to the gate electrode of the first transistor T1 as described above, and the other end of the capacitor Cst is connected to the first driving voltage line VL1. A cathode of the light-emitting diode ED may be connected to the second driving voltage line VL2 for transferring the second driving voltage ELVSS. A structure of the pixel PXij according to an embodiment of the invention is not limited to the structure illustrated in FIG. 5A, and thus the number of transistors and the number of capacitors included in one pixel PXij and a connection relationship thereof may be variously modified.

Figure 5B:
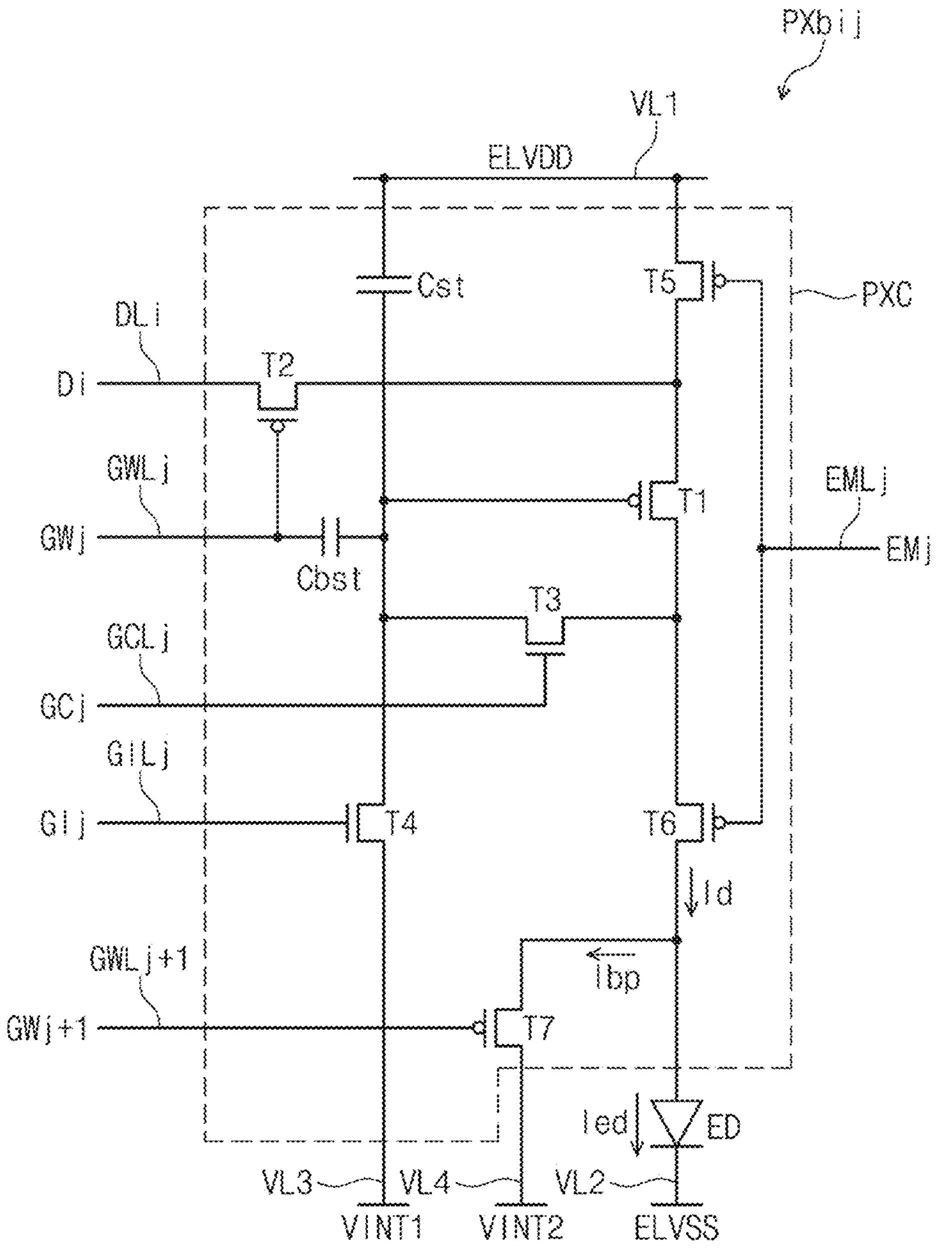
FIG. 5B is an equivalent circuit diagram of an alternative embodiment of a pixel according to the invention.

FIG. 5B is an equivalent circuit diagram of an alternative embodiment of a pixel PX according to the invention.

The embodiment of the pixel PXbij illustrated in FIG. 5B is substantially the same as the embodiment of the pixel PXij illustrated in FIG. 5A except that the pixel PXbij illustrated in FIG. 5B further includes an additional capacitor Cbst, and thus any repetitive detailed descriptions of the same elements as those illustrated in FIG. 5A will be omitted. In such an embodiment, as shown in FIG. 5B, one end of the additional capacitor Cbst in the pixel PXbij is connected to the scan line GWLj, and the other end of the additional capacitor Cbst is connected to the gate electrode of the first transistor T1.

Figure 6:
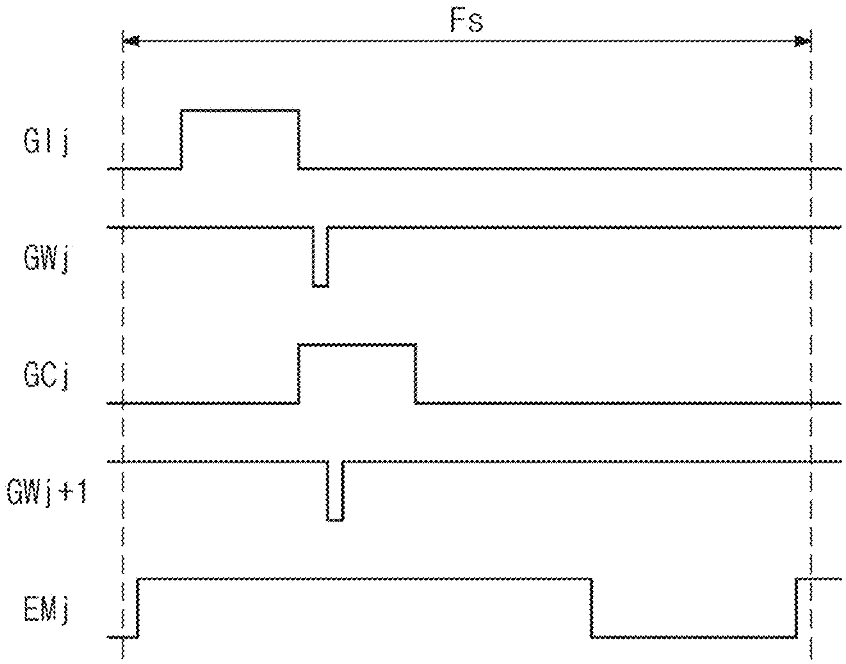
FIG. 6 is a timing diagram of an embodiment of an operation of the pixel illustrated in FIG. 5A.

FIG. 6 is a timing diagram for describing an embodiment of an operation of the pixel PXij illustrated in FIG. 5A. Operation of a display device DD according to an embodiment will be described with reference to FIGS. 5A and 6.

Referring to FIGS. 5A and 6, the scan signal GIj of a high level is provided through the j-th scan line GILj during an initialization period within one frame Fs. The fourth transistor T4 is turned on in response to the scan signal GIj of a high level, and the first initialization voltage VINT1 is transferred to the gate electrode of the first transistor T1 via the fourth transistor T4 so that the first transistor T1 is initialized.

Next, the third transistor T3 is turned on when the scan signal GCj of a high level is supplied via the j-th scan line GCLj during a data programming and compensation period. The first transistor T1 is diode-connected by the third transistor T3 turned on, and is forward biased. Furthermore, the second transistor T2 is turned on by the scan signal GWj of a low level. As a result, a compensation voltage obtained by subtracting a threshold voltage of the first transistor T1 from the data signal Di supplied through the i-th data line DLi is applied to the gate electrode of the first transistor T1. That is, a gate voltage applied to the gate electrode of the first transistor T1 may be the compensation voltage.

The first driving voltage ELVDD and the compensation voltage may be applied to two ends of the capacitor Cst, and a quantity of charge corresponding to a difference between the voltages of the two ends may be stored in the capacitor Cst.

The seventh transistor T7 is supplied with the scan signal GWj+1 of a low level through the (j+1)-th scan line GWLj+1 to be turned on. A portion of the driving current Id may pass through the seventh transistor T7 as a bypass current Ibp.

If the light-emitting diode ED emits light even when a minimum current of the first transistor T1 for displaying a black image flows as the driving current Id, the black image is not displayed normally. Therefore, the seventh transistor T7 included in the pixel PXij in an embodiment of the invention may distribute a portion of the minimum current of the first transistor T1 as the bypass current Ibp to a current path other than a current path to the light-emitting diode ED. Here, the minimum current of the first transistor T1 represents a current under a condition in which the first transistor T1 is turned off since a gate-source voltage of the first transistor T1 is less than the threshold voltage. The minimum driving current Id (e.g., about 10 picoampere (pA) or less) under the condition in which the first transistor T1 is turned off is transferred to the light-emitting diode ED to be expressed as a black image. The effect of the bypass of the bypass current Ibp may be significant when the minimum driving current Id for displaying a black image flows, whereas the effect of the bypass current Ibp may be negligible when a large driving current Id for displaying a general image or a white image flows. Therefore, when the driving current Id flows to display a black image, an emission current led of the light-emitting diode ED obtained by subtracting a current amount of the bypass current Ibp that has pass through the seventh transistor T7 from the driving current Id has a minimum current amount for clearly expressing the black image. Therefore, a correct black image may be obtained using the seventh transistor T7, thereby improving a contrast ratio. In such an embodiment, a bypass signal is the scan signal GWj+1 of a low level, but an embodiment of the invention is not limited thereto.

Next, during an emission period, the emission signal EMj supplied through the j-th emission control line EMLj is changed from a high level to a low level. During the emission period, the fifth transistor T5 and the sixth transistor T6 are turned on by the emission signal EMj of a low level. As a result, the driving current Id corresponding to a voltage difference between the first driving voltage ELVDD and the gate voltage of the gate electrode of the first transistor T1 is generated, and the driving current Id is supplied to the light-emitting diode ED via the sixth transistor T6 so that the emission current led flows through the light-emitting diode ED.

Figure 7:
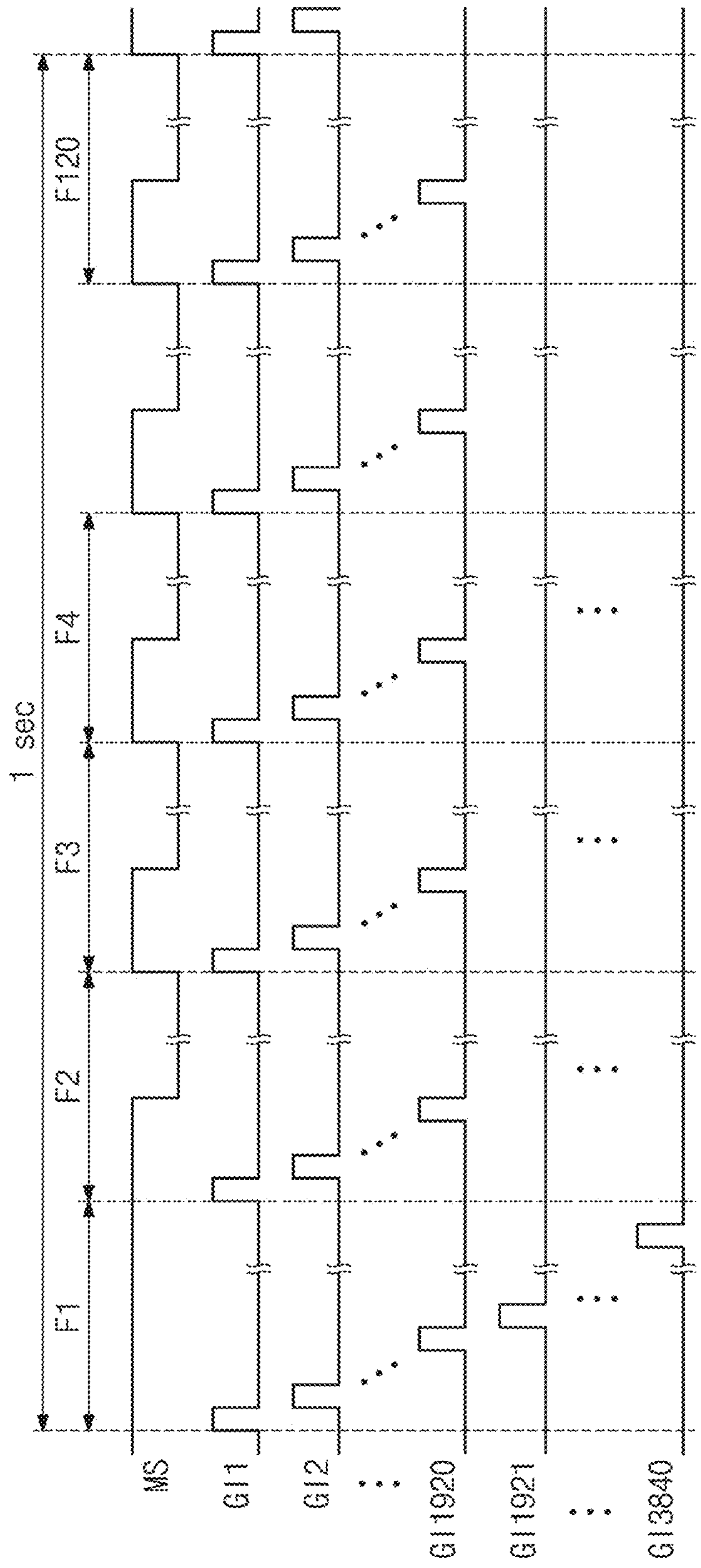
FIG. 7 is a diagram exemplarily illustrating scan signals output from the scan driving circuit illustrated in FIG. 4 in a normal mode and in a low-power mode.

FIG. 7 is a diagram exemplarily illustrating scan signals GI1 to GI3840 output from the scan driving circuit SD illustrated in FIG. 4 in a normal mode and in a low-power mode.

Referring to FIGS. 4 and 7, the scan control signal SCS provided from the driving controller 100 to the scan driving circuit SD may include a masking signal MS. The masking signal MS may be a signal indicating a start position of the second display region DA2 illustrated in FIG. 1.

The scan driving circuit SD may output the scan signals GI1 to GI3840 in response to the masking signal MS. During the normal mode, the masking signal MS may be maintained at a high level in all frames, and the scan driving circuit SD may sequentially output the scan signals GI1 to GI3840 at a high level in each frame.

During the multi-frequency mode MFM, the masking signal MS may transition to a low level at a preset point within one frame. In an embodiment, as illustrated in FIG. 3B, in the multi-frequency mode MFM, the first driving frequency of the first display region DA1 may be 120 Hz, and the second driving frequency of the second display region DA2 may be 1 Hz. In such an embodiment, the first image IM1 is displayed in each of first frame F1 to 120-th frame F120 in the first display region DA1 of the display device DD. In the second display region DA2, the second image IM2 may be displayed only in the first frame F1 and may not be displayed in the other frames F2 to F120. Since images are displayed both in the first display region DA1 and the second display region DA2 of the display device DD during the first frame F1, the first frame F1 may be referred to as a normal frame. Since images are displayed only in the first display region DA1 during the other frames F2 to F120, the other frames F2 to F120 may be referred to as partial frames.

The masking signal MS is maintained at a high level in the first frame F1 of the multi-frequency mode MFM. Therefore, the scan signals GI1 to GI3840 may be sequentially activated to a high level.

In the second to 120-th frames F2 to F120 of the multi-frequency mode MFM, the masking signal MS is changed from a high level to a low level at a preset point within each frame. In one embodiment, for example, while the masking signal MS is maintained at a high level in the second frame F2, the scan signals GI1 to GI1920 may be sequentially driven at a high level. When the masking signal MS is changed to a low level in the second frame F2, the scan signals GI1921 to GI3840 are maintained at a low level without being changed to a high level. Since this masking signal MS is provided to the scan driving circuit SD, the scan signals GI1921 to GI3840 may be maintained at a low level in the second to 120-th frames F2 to F120.

The masking signal MS illustrated in FIG. 7 is an exemplary waveform for describing operation of the scan driving circuit SD, and the waveform and/or signal level of the masking signal MS may be variously modified. Two or more masking signals may be provided from the driving controller 100 to the scan driving circuit SD.

Although FIG. 7 illustrates only the scan signals GI1 to GI3840, the scan driving circuit SD may generate scan signals GC1 to GC3840 and GW1 to GW3840 in a similar manner to that for the scan signals GI1 to GI3840 in response to the masking signal MS. Furthermore, the emission driving circuit EDC may generate emission signals EM1 to EM3840 in a similar manner to that for the scan signals GI1 to GI3840 in response to the masking signal MS.

Figure 8:
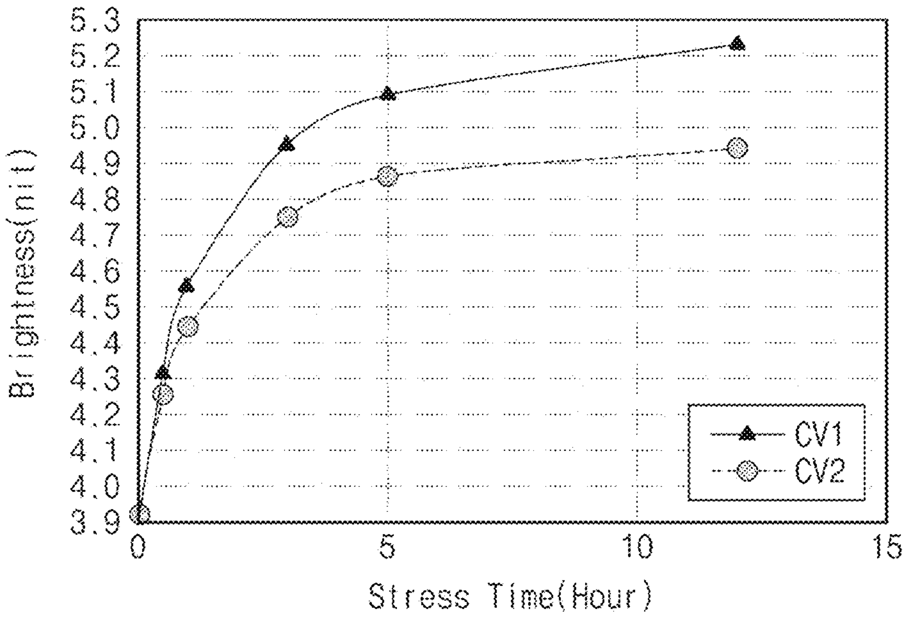
FIG. 8 is a diagram exemplarily illustrating an afterimage effect due to a driving frequency difference between a first display region and a second display region.

FIG. 8 is a diagram exemplarily illustrating an afterimage effect due to a driving frequency difference between a first display region DA1 and a second display region DA2.

Referring to FIGS. 1 and 8, the first driving frequency of the first display region DA1 may be 100 Hz, and the second driving frequency of the second display region DA2 may be 1 Hz. FIG. 8 shows a case where an image of gray gradation (e.g., 32 gradation levels) is displayed in the first display region DA1 and the second display region DA2 after an image of white gradation (e.g., 255 gradation levels) is displayed in the first display region DA1 and the second display region DA2 for a long time.

A first curve CV1 indicates a brightness change according to a time during which an image of white gradation (e.g., 255 gradation levels) has been displayed in the first display region DA1 when an image corresponding to gray gradation (e.g., 32 gradation levels) is displayed in the first display region DA1.

A second curve CV2 indicates a brightness change according to a time during which an image of white gradation (e.g., 255 gradation levels) has been displayed in the second display region DA2 when an image corresponding to gray gradation (e.g., 32 gradation levels) is displayed in the second display region DA2.

In this case, a measured brightness of the first display region DA1 is about 5.08 nits when an image of gray gradation is displayed in the first display region DA1 after an image of white gradation has been displayed in the first display region DA1 for five hours.

The measured brightness of the first display region DA1 is about 5.2 nits when the image of gray gradation is displayed in the first display region DA1 after the image of white gradation has been displayed in the first display region DA1 for 10 hours.

In this case, a measured brightness of the second display region DA2 is about 4.87 nits when the image of gray gradation is displayed in the second display region DA2 after the image of white gradation has been displayed in the second display region DA2 for five hours.

The measured brightness of the second display region DA2 is about 4.92 nits when the image of gray gradation is displayed in the second display region DA2 after the image of white gradation has been displayed in the second display region DA2 for 10 hours.

Accordingly, as shown in FIG. 8, the first and second display regions DA1 and DA2 may display images of different brightness (5.08 nits, 4.87 nits) when a same image of gray gradation is displayed in the first display region DA1 and the second display region DA2 after a same image of white gradation has been displayed in the first display region DA1 and the second display region DA2 for five hours.

The first and second display regions DA1 and DA2 display images of different brightness (5.2 nits, 4.92 nits) when the same image of gray gradation is displayed in the first display region DA1 and the second display region DA2 after the same image of white gradation has been displayed in the first display region DA1 and the second display region DA2 for 10 hours.

Furthermore, it may be recognized from FIG. 8 that a difference, i.e., a brightness difference, between the first curve CV1 and the second curve CV2 increases as a display time of the image of white gradation increases. That is, it may be recognized from FIG. 8 that an afterimage effect varies according to the driving frequency of the first display region DA1 and the second display region DA2 when an image of the same gradation is displayed for a long time. In this case, a brightness difference due to an afterimage at a boundary between the first display region DA1 and the second display region DA2 may be viewed by the user.

Figure 9:
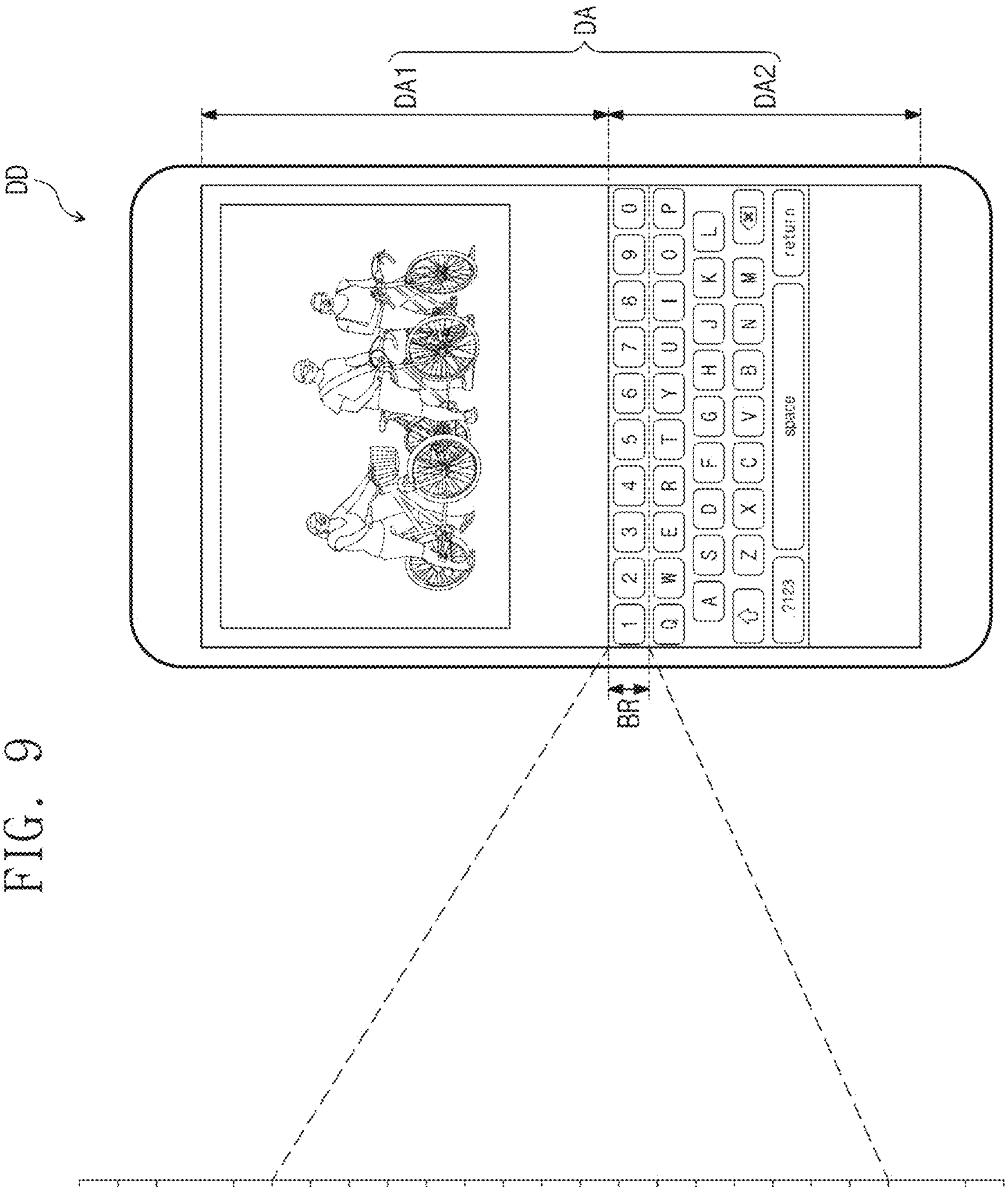
FIG. 9 is a diagram for describing a driving method for reducing a brightness difference due to an afterimage at a boundary between a first display region and a second display region.

FIG. 9 is a diagram for describing a driving method for reducing a brightness difference due to an afterimage at a boundary between the first display region DA1 and the second display region DA2.

Referring to FIG. 9, in an embodiment, the display region DA of the display device DD may include a first horizontal line L1 to an n-th horizontal line Ln. In one embodiment, for example, the pixels PX of the first horizontal line L1 may be connected to the first scan lines GILL GCL1, and GWL1, and the second scan line GWL2 and the first emission control line EML1 as illustrated in FIG. 4. In such an embodiment, the pixels PX of a j-th horizontal line (or a j-th pixel row) Lj may be connected to the j-th scan lines GILj, GCLj, and GWLj, and the (j+1)-th scan line GWLj+1 and the j-th emission control line EMLj as illustrated in FIG. 4.

The first display region DA1 may include the first horizontal line L1 to k-th horizontal line Lk, and the second display region DA2 may include a (k+1)-th horizontal line Lk+1 to n-th horizontal line Ln. In the second display region DA2, a boundary region between the first display region DA1 and the second display region DA2, i.e., a region between the (k+1)-th horizontal line Lk+1 to the (k+16)-th horizontal line Lk+16, may be referred to as a boundary region BR for stress boundary diffusion. Hereinafter, for convenience of description, an embodiment where the number of the horizontal lines included in the boundary region BR is 16 will be described in detail, but an embodiment of the invention is not limited thereto. In an embodiment, the boundary region BR is included in the second display region DA2, as illustrated in FIG. 9, but an embodiment of the invention is not limited thereto. In one embodiment, for example, the boundary region BR may include a portion of the first display region DA1 and a portion of the second display region DA2. In an embodiment, the boundary region BR may include only a portion of the first display region DA1.

When the first display region DA1 is driven at a first driving frequency (e.g., 60 Hz) and the second display region DA2 is driven at a second driving frequency (e.g., 1 Hz), the boundary region BR may be driven at a driving frequency that is lower than the first driving frequency and higher than the second driving frequency.

In an embodiment, as illustrated in FIG. 9, the (k+1)-th horizontal line Lk+1 to the (k+16)-th horizontal line Lk+16 are driven at different driving frequencies from each other, and the driving frequencies gradationally decrease in a direction away from the first display region DA1 (in the opposite direction to the second direction DR2).

FIGS. 10A and 10B are diagrams illustrating an embodiment of a method of driving the horizontal lines of the boundary region BR.

Referring to FIGS. 9, 10A, and 10B, the boundary region BR may include the (k+1)-th horizontal line Lk+1 to the (k+16)-th horizontal line Lk+16. Each of the (k+1)-th to (k+16)-th horizontal lines Lk+1 to Lk+16 may be driven (D) or masked (M) between a second frame and a 32-nd frame.

In an embodiment, the first driving frequency of the first display region DA1 may be 60 Hz, and the second driving frequency of the second display region DA2 may be 1 Hz. In such an embodiment, all of the (k+1)-th to (k+16)-th horizontal lines Lk+1 to Lk+16 may be driven (D) in a first frame. Here, the term "drive (D)" indicates that the scan signals GI1 to GI1920 are sequentially driven at a high level while the masking signal MS has a high level.

All of the (k+1)-th to (k+16)-th horizontal lines Lk+1 to Lk+16 may be masked (M) in a second frame.

In a third frame, the (k+1)-th horizontal lines Lk+1 is driven (D), and the other horizontal lines Lk+2 to Lk+16 are masked (M). Here, the term "mask (M)" indicates that all of the scan signals GIk+2 to GIk+16 are maintained at a low level since the masking signal MS transitions to a low level.

In this manner, the number of horizontal lines driven (D) in the boundary region BR sequentially increases by one from the second frame to 31-st frame, and the number of horizontal lines driven (D) in the boundary region BR sequentially decreases by one from the 32-nd frame to 59-th frame When the display device DD operates from the first frame to 60-th frame in this manner, the driving frequency of the (k+1)-th horizontal line Lk+1 is 58 Hz, the driving frequency of the (k+2)-th horizontal line Lk+2 is 56 Hz, and the (k+16)-th horizontal line Lk+16 is 2 Hz.

In an embodiment illustrated in FIGS. 10A and 10B, all of the (k+1)-th to (k+16)-th horizontal lines Lk+1 to Lk+16 are masked (M) in the second frame, and the (k+1)-th to (k+16)-th horizontal lines Lk+1 to Lk+16 are sequentially driven from the third frame, but an embodiment of the invention is not limited thereto. Whether the (k+1)-th to (k+16)-th horizontal lines Lk+1 to Lk+16 are driven (D) or masked (M) from the second frame to 60-th frame may be determined based on the driving frequency of each of the (k+1)-th to (k+16)-th horizontal lines Lk+1 to Lk+16.

Figure 11:
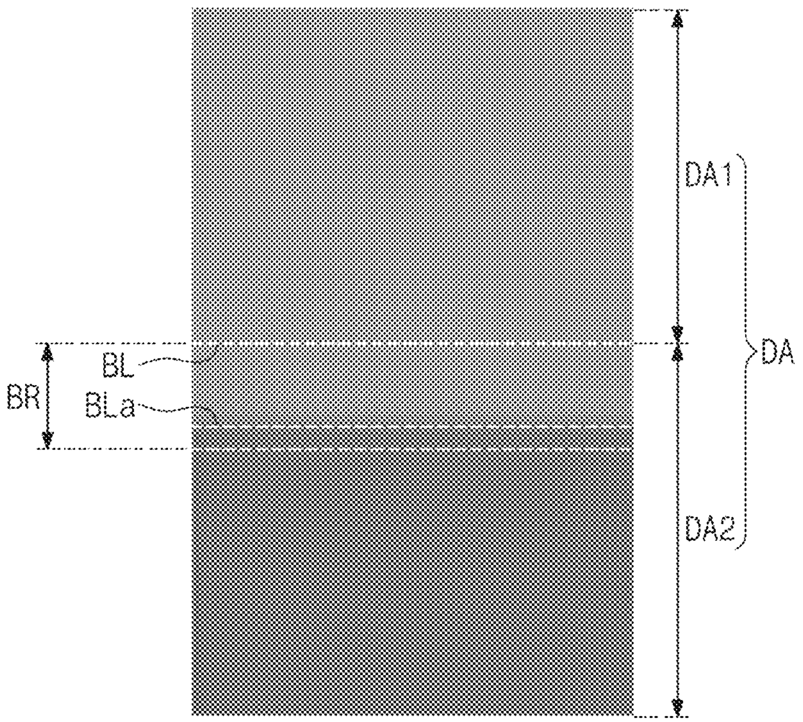
FIG. 11 is a diagram illustrating an afterimage effect due to a driving frequency difference between a first display region and a second display region after the method of driving the horizontal lines of the boundary region, illustrated in FIGS. 10A and 10B, is applied.

FIG. 11 is a diagram illustrating an afterimage effect due to a driving frequency difference between a first display region DA1 and a second display region DA2 after the method of driving the horizontal lines of the boundary region BR, illustrated in FIGS. 10A and 10B, is applied.

FIG. 11 shows a case where an image of gray gradation (e.g., 32 gradation levels) is displayed in the first display region DA1 and the second display region DA2 after an image of white gradation (e.g., 255 gradation levels) is displayed in the first display region DA1 and the second display region DA2 for a long time.

When an image of white gradation is displayed in the first display region DA1 and the second display region DA2 for a long time, the brightness of gray gradation displayed in the first display region DA1 and the second display region DA2 may be different according to the driving frequency of each of the first display region DA1 and the second display region DA2.

When the method of driving the horizontal lines of the boundary region BR, illustrated in FIGS. 10A and 10B, is applied, the brightness difference between the first display region DA1 and the second display region DA2 at a boundary line BL may be effectively prevented. However, in a predetermined location in the boundary region BR, a brightness boundary line BLa appears, from which a brightness difference due to afterimage is viewed or recognized. This is caused by a non-linear proportional relationship between a driving frequency and brightness.

Figure 12:
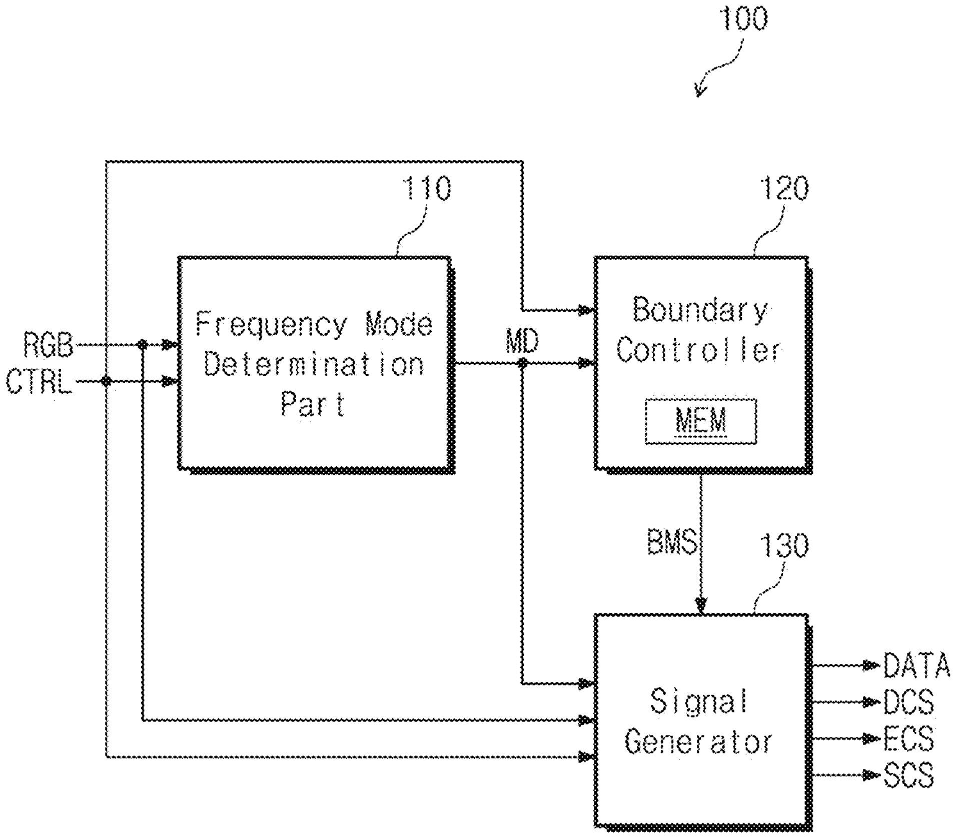
FIG. 12 is a block diagram illustrating a configuration of an embodiment of a driving controller according to the invention.

FIG. 12 is a block diagram illustrating a configuration of an embodiment of a driving controller 100 according to the invention.

Referring to FIGS. 4 and 12, an embodiment of the driving controller 100 includes a frequency mode determination part 110, a boundary controller 120, and a signal generator 130. The frequency mode determination part 110 determines a frequency mode based on the image signal RGB and the control signal CTRL, and outputs a mode signal MD corresponding to the determined frequency mode.

The boundary controller 120 outputs a boundary masking signal BMS for controlling masking of the boundary region BR in response to the control signal CTRL when the mode signal MD received from the frequency mode determination part 110 indicates the multi-frequency mode. The boundary controller 120 may include a memory MEM, which stores masking information about the boundary region BR. The memory MEM may be a storage device that stores data temporarily or permanently, such as a register, a random access memory ("RAM"), a flash memory, or the like.

The signal generator 130 receives the image signal RGB, the control signal CTRL, the mode signal MD from the frequency mode determination part 110, and the boundary masking signal BMS from the boundary controller 120. The signal generator 130 outputs the image data signal DATA, the data control signal DCS, the emission control signal ECS, and the scan control signal SCS in response to the image signal RGB, the control signal CTRL, the mode signal MD, and the boundary masking signal BMS.

In an embodiment, when the mode signal MD indicates the normal mode, the signal generator 130 may output the image data signal DATA, the data control signal DCS, the emission control signal ECS, and the scan control signal SCS for driving each of the first display region DA1 (see FIG. 1) and the second display region DA2 (see FIG. 1) at a normal driving frequency. The data driving circuit 200, the scan driving circuit SD, and the emission driving circuit EDC illustrated in FIG. 4 operate in response to the image data signal DATA, the data control signal DCS, the scan control signal SCS, and the emission control signal ECS so that an image is displayed on the display panel DP.

In an embodiment, when the mode signal MD indicates the multi-frequency mode, the signal generator 130 may output the image data signal DATA, the data control signal DCS, the emission control signal ECS, and the scan control signal SCS for driving the first display region DA1 at a first driving frequency and the second display region DA2 at a second driving frequency. In an embodiment, the first driving frequency may be the same as the normal frequency. In an embodiment, the first driving frequency may be higher than the normal frequency.

In such an embodiment, when the mode signal MD indicates the multi-frequency mode, the signal generator 130 may output the image data signal DATA, the data control signal DCS, the emission control signal ECS, and the scan control signal SCS for driving a boundary region BR adjacent to the first display region DA1 at a third driving frequency between the first driving frequency and the second driving frequency.

The frequency mode determination part 110, the boundary controller 120, and the signal generator 130 illustrated in FIG. 12 illustrate functions of the driving controller 100 in a block form, and an embodiment of the invention is not limited to that illustrated in FIG. 12. In one embodiment, for example, the frequency mode determination part 110 and the boundary controller 120 may be implemented as one functional block, or the boundary controller 120 and the signal generator 130 may be implemented as one functional block.

Figure 13:
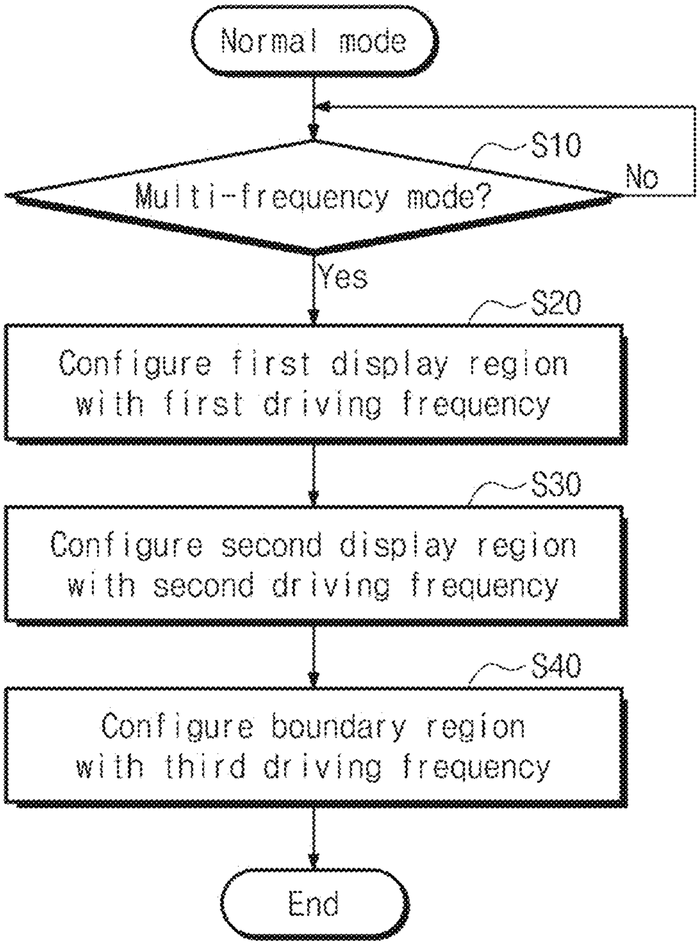
FIG. 13 is a flowchart exemplarily illustrating operation of the driving controller illustrated in FIG. 12.

FIG. 13 is a flowchart exemplarily illustrating operation of the driving controller 100 illustrated in FIG. 12.

Referring to FIGS. 9, 12, and 13, the frequency mode determination part 110 of the driving controller 100 may set an operation mode to a normal mode at an initial stage (e.g., after being powered up).

The frequency mode determination part 110 determines a frequency mode based on the image signal RGB and the control signal CTRL. In one embodiment, for example, when a portion (e.g., an image signal corresponding to the first display region DA1) of the image signal RGB of one frame is a moving image, and another portion (e.g., an image signal corresponding to the second display region DA2) is a still image, the frequency mode determination part 110 determines the operation mode as a multi-frequency mode (S10). When the operation mode is determined as the multi-frequency mode, the frequency mode determination part 110 outputs the mode signal MD corresponding to the multi-frequency mode.

When the mode signal MD indicates the multi-frequency mode, the signal generator 130 sets the driving frequency of the first display region DA1 to a first driving frequency (S20).

When the mode signal MD indicates the multi-frequency mode, the signal generator 130 sets the driving frequency of the second display region DA2 to a second driving frequency (S30). The second driving frequency may be lower than the first driving frequency.

When the mode signal MD indicates the multi-frequency mode, the signal generator 130 sets the driving frequency of the boundary region BR adjacent to the first display region DA1 in the second display region DA2 to a third driving frequency (S40). The third driving frequency may be lower than the first driving frequency and higher than the second driving frequency. The third driving frequency of the boundary region BR may be determined according to the boundary masking signal BMS output from the boundary controller 120.

The signal generator 130 may output the image data signal DATA, the scan control signal SCS, the data control signal DCS, and the emission control signal ECS based on the set frequencies of the first display region DA1, the second display region DA2, and the boundary region BR.

An embodiment of a method of setting the third driving frequency of the boundary region BR will hereinafter be described in detail.

Figure 14B:
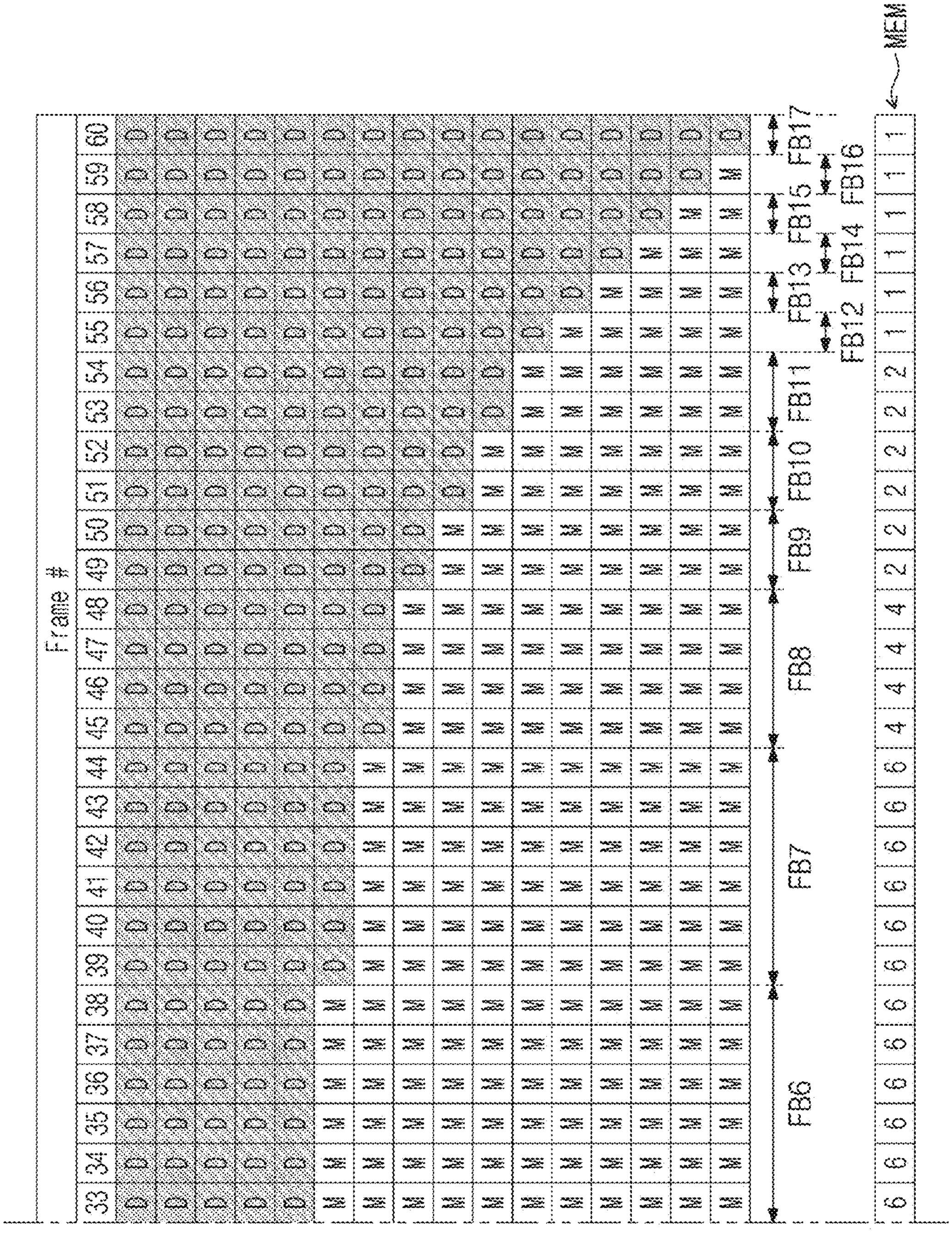

FIGS. 14A and 14B are diagrams illustrating an embodiment of a method of driving horizontal lines of a boundary region BR.

Referring to FIGS. 9, 12, 14A, and 14B, in an embodiment, the boundary region BR may include H horizontal lines (where H is a natural number). In one embodiment, for example, the boundary region BR includes 16 horizontal lines including a (k+1)-th horizontal line Lk+1 to (k+16)-th horizontal line Lk+16. Each of the (k+1)-th to (k+16)-th horizontal lines Lk+1 to Lk+16 may be driven (D) or masked (M) between a second frame and a 60-th frame. The number of the horizontal lines included in the boundary region BR may be variously changed.

In an embodiment, the first driving frequency of the first display region DA1 may be 60 Hz, and the second driving frequency of the second display region DA2 may be 1 Hz. In such an embodiment, all of the (k+1)-th to (k+16)-th horizontal lines Lk+1 to Lk+16 may be driven (D) in a first frame. Here, the term "drive (D)" indicates that the scan signals GI1 to GI3840 (see FIG. 7) are sequentially driven at a high level while the masking signal MS (see FIG. 7) has a high level.

The boundary controller 120 included in the driving controller 100 masks (M) 16 horizontal lines Lk+1 to Lk+16 during M frames among A frames (where M is a natural number, and A is a natural number greater than M) and drives (D) the 16 horizontal lines Lk+1 to Lk+16 during (A-M) frames.

In one embodiment, for example, the boundary controller 120 masks (M) the (k+1)-th horizontal line Lk+1 during six frames including the second frame to the seventh frame among 59 frames including the second frame to the 60-th frame, and drives (D) the (k+1)-th horizontal line Lk+1 from the eighth frame to the 60-th frame. The boundary controller 120 masks (M) the (k+2)-th horizontal line Lk+2 during 12 frames including the second frame to the 13-th frame, and drives (D) the (k+2)-th horizontal line Lk+2 from the 14-th frame to the 60-th frame.

In other words, from the eighth frame to the 13-th frame, only the (k+1)-th horizontal line Lk+1 is driven (D), and the other horizontal lines Lk+2 to Lk+16 are masked (M). Furthermore, from the 14-th frame to 19-th frame, only the (k+1)-th horizontal line Lk+1 and the (k+2)-th horizontal line Lk+2 are driven (D), and the other horizontal lines Lk+3 to Lk+16 are masked (M).

Consecutive frames having the same number of horizontal lines being driven (D) or masked (M) within the boundary region BR may be referred to as a frame block, and the number Fn of frames included in each frame block is stored in the memory MEM included in the boundary controller 120.

In an embodiment, as illustrated in FIGS. 14A and 14B, each of some frame blocks FB1, FB2, FB3, FB5, FB6, and FB7 includes six frames, a frame block FB4 includes seven frames, a frame block FB8 includes four frames, each of frames blocks FB9, FB10, and FM11 includes two frames, and each of frames blocks FB12 to FB17 includes one frame.

In the following descriptions, the second frame is referred to as a boundary frame since the (k+1)-th to (k+16)-th horizontal lines Lk+1 to Lk+16 of the boundary region BR starts to be driven (D) or masked (M) at the second frame.

In an embodiment, as illustrated in FIGS. 14A and 14B, all of the (k+1)-th to (k+16)-th horizontal lines Lk+1 to Lk+16 are masked (M) from the second frame to the seventh frame, and the (k+1)-th to (k+16)-th horizontal lines Lk+1 to Lk+16 are sequentially driven (D) from the eighth frame, but an embodiment of the invention is not limited thereto. Whether the (k+1)-th to (k+16)-th horizontal lines Lk+1 to Lk+16 are driven (D) or masked (M) from the second frame to 60-th frame may be determined based on the driving frequency of each of the (k+1)-th to (k+16)-th horizontal lines Lk+1 to Lk+16.

Figure 15:
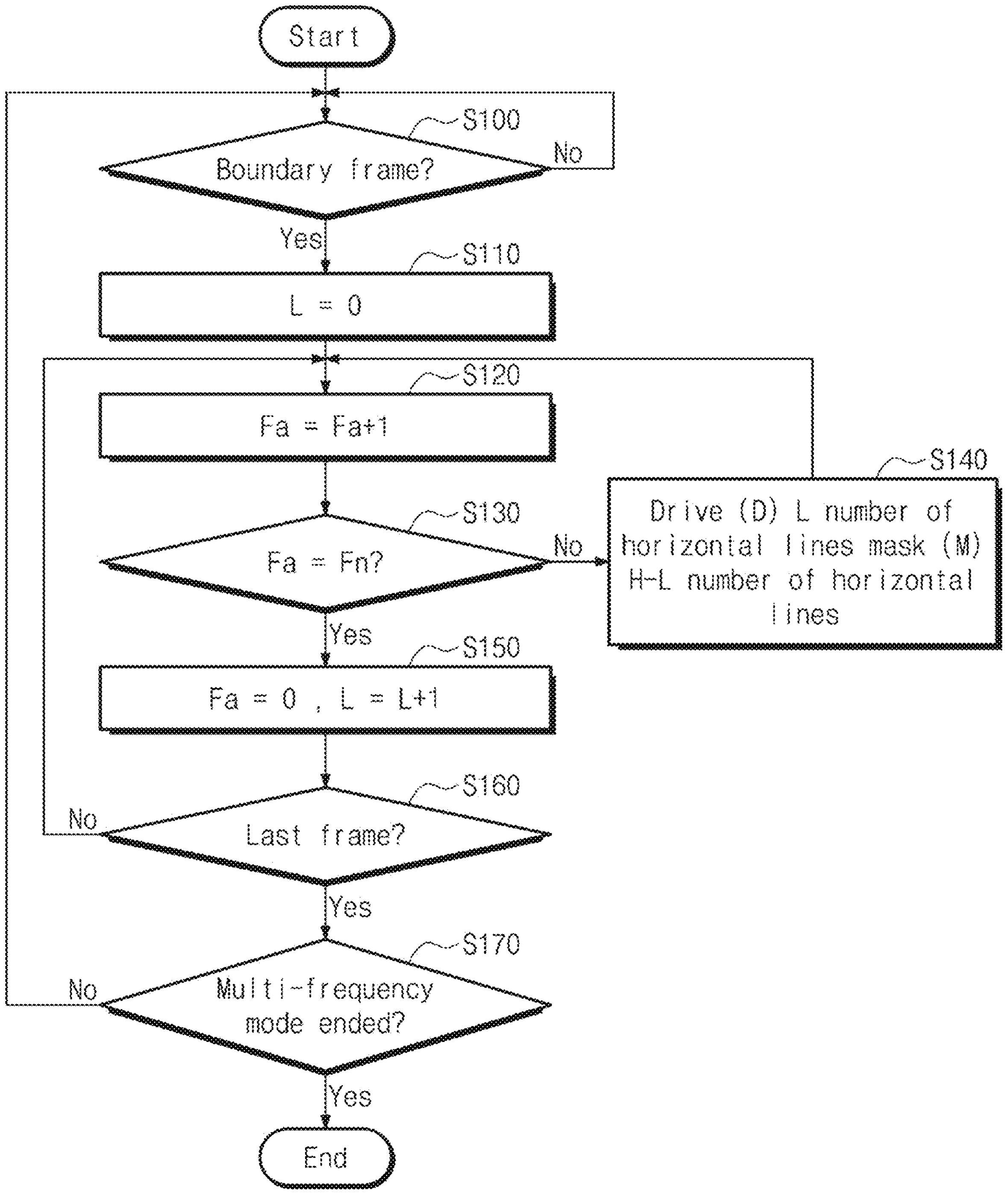
FIG. 15 is a flowchart exemplarily illustrating operation of the boundary controller illustrated in FIG. 12.

FIG. 15 is a flowchart exemplarily illustrating operation of the boundary controller 120 illustrated in FIG. 12.

Referring to FIGS. 12, 14A, 14B, and 15, in an embodiment, the boundary controller 120 determines whether a current frame is a boundary frame on the basis of the control signal CTRL when the mode signal MD output from the frequency mode determination part 110 indicates the multi-frequency mode (S100). In an embodiment, as illustrated in FIGS. 14A and 14B, the second frame corresponds to the boundary frame.

If the current frame is a boundary frame, the boundary controller 120 initializes the number L of driving lines to 0 (S110).

The boundary controller 120 increases a frame count Fa by one (S120).

The boundary controller 120 determines whether the counted frame count Fa is equal to the frame number Fn stored in the memory MEM (S130). When the current frame is the second frame, the frame number Fn stored in the memory MEM is 6.

If the counted frame count Fa is not equal to the frame number Fn, the boundary controller 120 outputs the boundary masking signal BMS for driving (D) L horizontal lines and masking (M) the other horizontal lines, i.e., (H-L) horizontal lines (S140). Since L=0 in the second frame, the (k+1)-th to (k+16)-th horizontal lines Lk+1 to Lk+16 are masked (M).

In this manner, the boundary controller 120 repeats operation S120, operation S130, and operation S140 from the second frame to the seventh frame.

If the frame count Fa counted in the seventh frame is equal to the frame number Fn, the boundary controller 120 resets the counted frame count Fa to 0, and increases the number L of driving lines by one (S150). The number L of driving lines becomes 1.

The boundary controller 120 determines whether the current frame is a last frame (S160). In an embodiment, as illustrated in FIGS. 14A and 14B, the 60-th frame corresponds to the last frame.

If the current frame is not the last frame, the process returns to operation S120.

In the eighth frame, the boundary controller 120 increases the frame count Fa by one (S120), and, since the counted frame count Fa is not equal to the frame number Fn (1≠6), the boundary controller 120 outputs the boundary masking signal BMS for driving (D) L horizontal lines, i.e., one horizontal line Lk+1, and masking (M) the other horizontal lines Lk+2 to Lk+16 (S140). That is, from the eighth frame, only the (k+1)-th horizontal line Lk+1 is driven (D), and the other horizontal lines Lk+2 to Lk+16 are masked (M).

In this manner, the boundary controller 120 may operate for the second frame to the 60-th frame.

If the mode signal MD output from the frequency mode determination part 110 indicates the multi-frequency mode, the process returns to operation S100 (S170). If the mode signal MD output from the frequency mode determination part 110 does not indicate the multi-frequency mode (i.e., changes to the normal mode), the boundary controller 120 stops outputting the boundary masking signal BMS.

Referring back to FIGS. 14A and 14B, since the numbers of frames included in the frame blocks FB1 to FB16 are nonlinearly (or unequally) set, the driving frequency of each of the (k+1)-th to (k+16)-th horizontal lines Lk+1 to Lk+16 may nonlinearly decrease. In such an embodiment, a frequency difference between horizontal lines located away from the first display region DA1 may be minutely adjusted.

Figure 16:
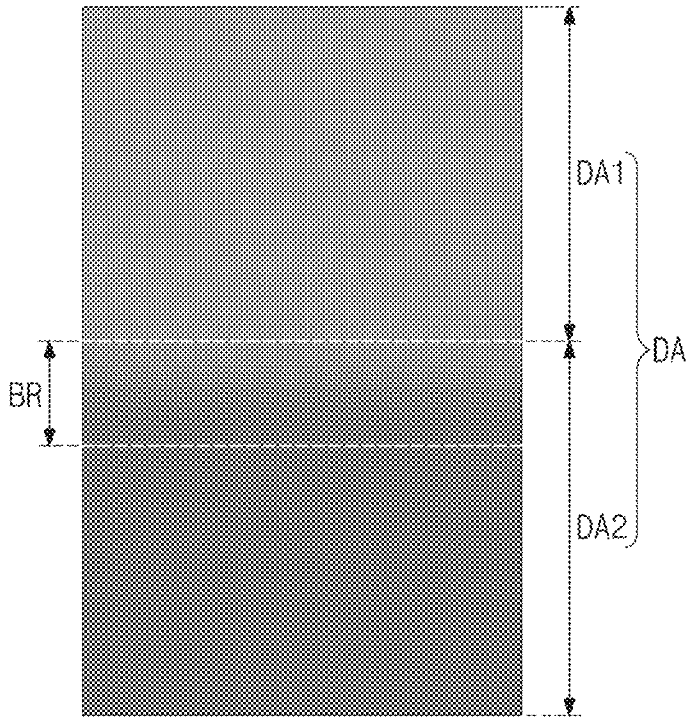
FIG. 16 is a diagram illustrating an afterimage effect due to a driving frequency difference between a first display region and a second display region after the method of driving the horizontal lines of the boundary region, illustrated in FIGS. 14A and 14B, is applied.

FIG. 16 is a diagram illustrating an afterimage effect due to a driving frequency difference between the first display region DA1 and the second display region DA2 after the method of driving the horizontal lines of the boundary region BR, illustrated in FIGS. 14A and 14B, is applied.

FIG. 16 shows a case where an image of gray gradation (e.g., 32 gradation levels) is displayed in the first display region DA1 and the second display region DA2 after an image of white gradation (e.g., 255 gradation levels) is displayed in the first display region DA1 and the second display region DA2 for a long time.

When an image of white gradation is displayed in the first display region DA1 and the second display region DA2 for a long time, the brightness of gray gradation displayed in the first display region DA1 and the second display region DA2 may be different according to the driving frequency of each of the first display region DA1 and the second display region DA2.

When the method of driving the horizontal lines of the boundary region BR, illustrated in FIGS. 14A and 14B, is applied, the brightness may gradually change in the boundary region BR. When the brightness gradually changes in the boundary region BR, user's recognition of a brightness difference may be minimized.

Figure 17B:
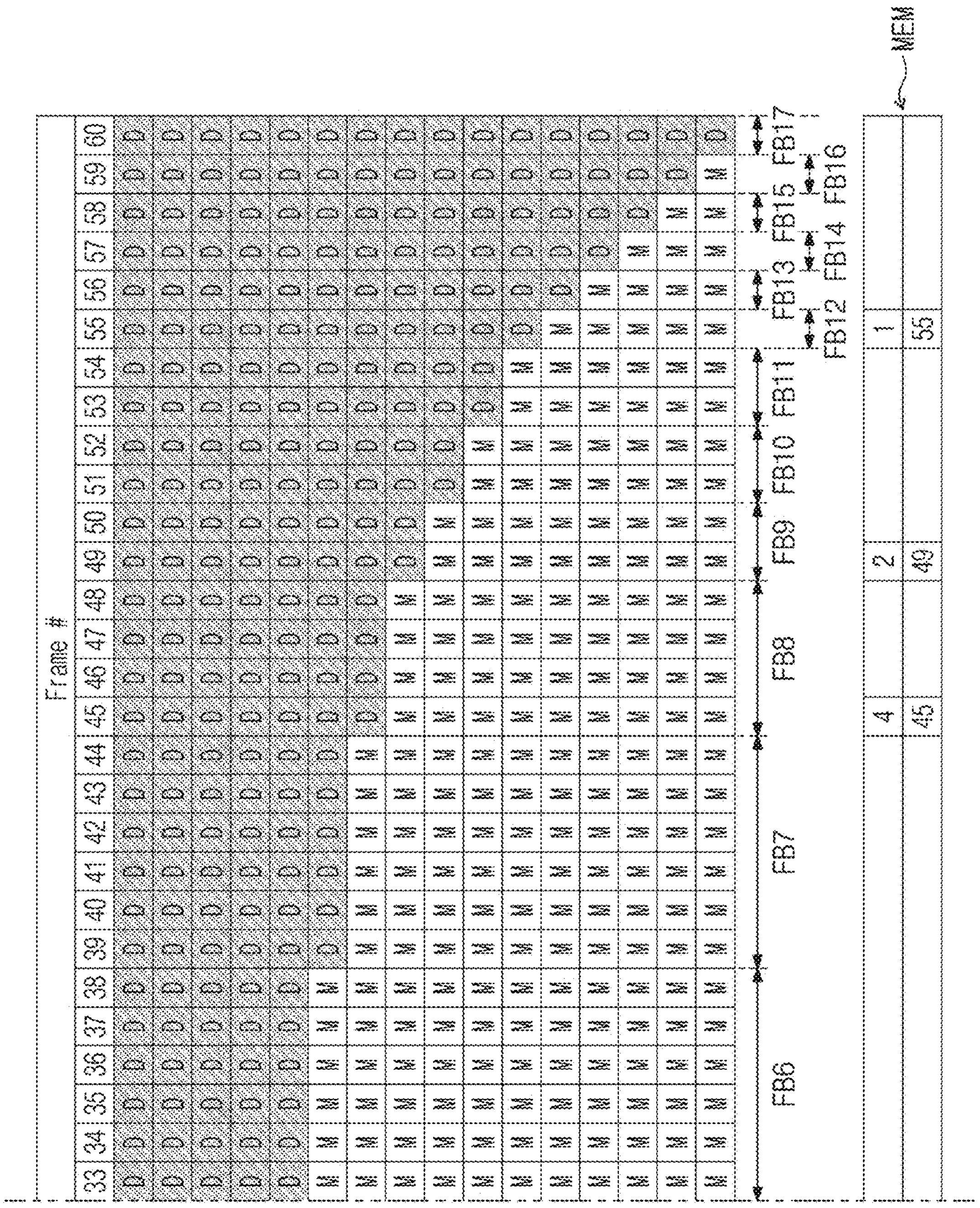

FIGS. 17A and 17B are diagrams illustrating an alternative embodiment of a method of driving horizontal lines of a boundary region BR.

An embodiment of the method of driving horizontal lines of a boundary region BR, illustrated in FIGS. 17A and 17B, are similar to the embodiment of the method described above with reference to FIGS. 14A and 14B. According to an embodiment of the method illustrated in FIGS. 14A and 14B, the frame number Fn for each frame block is stored in the memory MEM included in the boundary controller 120. According to an alternative embodiment of the method illustrated in FIGS. 17A and 17B, a masking change frame Fm indicating a location in which the frame number Fn is changed and the frame number Fn for the masking change frame Fm are stored in the memory MEM included in the boundary controller 120.

In one embodiment, for example, since each of frame blocks FB1, FB2, and FB3 includes six frames, and a masking start position is the second frame, number 6 indicating the frame number Fn and number 2 indicating the masking change frame Fm are stored in the memory MEM.

Since a frame block FB4 includes seven frames, and a masking change position is the 20-th frame, number 7 indicating the frame number Fn and number 20 indicating the masking change frame Fm are stored in the memory MEM.

Since each of frame blocks FB5, FB6, and FB7 includes six frames, and a masking change position is the 27-th frame, number 6 indicating the frame number Fn and number 27 indicating the masking change frame Fm are stored in the memory MEM.

Since a frame block FB8 includes four frames, and a masking start position is the 45th frame, number 4 indicating the frame number Fn and number 45 indicating the masking change frame Fm are stored in the memory MEM.

Since each of frame blocks FB9, FB10, and FB11 includes two frames, and a masking start position is the 49th frame, number 2 indicating the frame number Fn and number 49 indicating the masking change frame Fm are stored in the memory MEM.

Since each of frame blocks FB12 to FB17 includes one frame, number 1 indicating the frame number Fn and number 55 indicating the masking change frame Fm are stored in the memory MEM.

Figure 18:
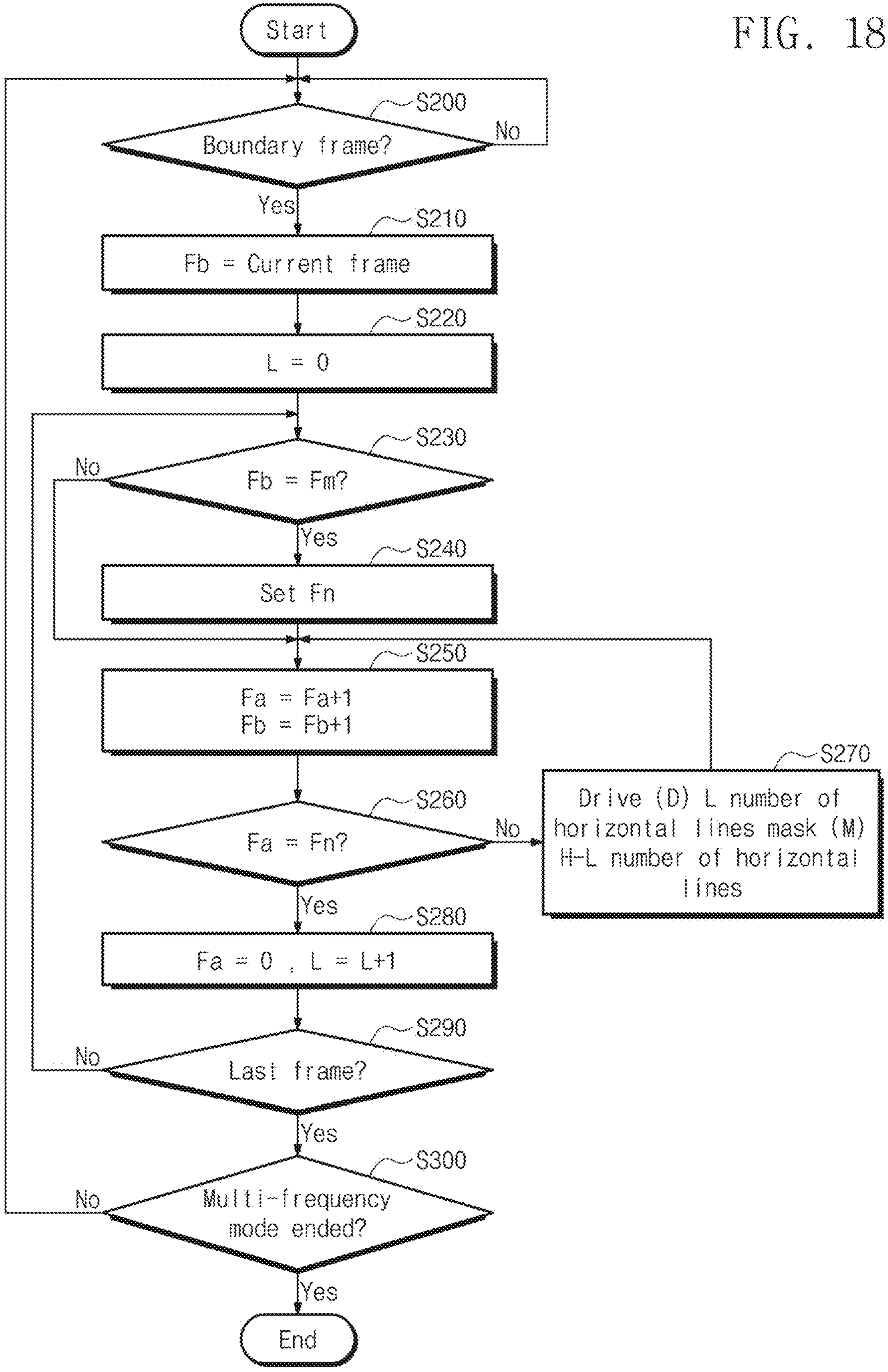
FIG. 18 is a flowchart exemplarily illustrating operation of the boundary controller illustrated in FIG. 12.

FIG. 18 is a flowchart exemplarily illustrating operation of the boundary controller 120 illustrated in FIG. 12.

Referring to FIGS. 12, 17A, 17B, and 18, the boundary controller 120 determines whether a current frame is a boundary frame on the basis of the control signal CTRL when the mode signal MD output from the frequency mode determination part 110 indicates the multi-frequency mode (S200). In an embodiment, as illustrated in FIGS. 17A and 17B, the second frame corresponds to the boundary frame.

If the current frame is a boundary frame, a second frame count Fb is set to the current frame (e.g., start of a boundary frame) (S210). In an embodiment, as illustrated in FIGS. 17A and 17B, since the boundary frame starts at the second frame, Fb may be set to 2.

The boundary controller 120 initializes the number L of driving lines to 0 (S220).

The boundary controller 120 determines whether the second frame count Fb is equal to the masking change frame Fm (S230). In an embodiment, as illustrated in FIGS. 17A and 17B, since the masking change frame Fm stored in the memory MEM is 2, Fb=Fm.

If Fb=Fm, the boundary controller 120 sets the frame number Fn to a value corresponding to the masking change frame Fm stored in the memory MEM (S240). In an embodiment, as illustrated in FIGS. 17A and 17B, since the frame number corresponding to the masking change frame (Fm=2) stored in the memory MEM, i.e., the second frame, is 6, Fn=6.

The boundary controller 120 may increase a first frame count Fa by one and increase the second frame count Fb by one (S250).

The boundary controller 120 determines whether the first frame count Fa is equal to the frame number Fn stored in the memory MEM (S260).

If the first frame count Fa is not equal to the frame number Fn stored in the memory MEM, the boundary controller 120 outputs the boundary masking signal BMS for driving (D) L horizontal lines and masking (M) the other horizontal lines, i.e., (H-L) horizontal lines (S270). Since L=0 in the second frame, 16 horizontal lines Lk+1 to Lk+16 are masked (M).

Operations S250, S260, and S270 are repeated until the first frame count Fa is equal to the frame number Fn (Fa=Fn) stored in the memory MEM. Therefore, in each of the second frame to the seventh frame, all of the (k+1)-th to (k+16)-th horizontal lines Lk+1 to Lk+16 are masked (M).

Since Fa=Fn when the first frame count Fa is 6, the boundary controller 120 resets the first frame count Fa to 0, and increases the number L of driving lines by one (S280).

The boundary controller 120 determines whether the current frame is a last frame (S290). In an embodiment, as illustrated in FIGS. 17A and 17B, the 60-th frame corresponds to the last boundary frame.

If the current frame is not the last frame, the process returns to operation S230.

The boundary controller 120 determines whether the second frame count Fb is equal to the masking change frame Fm (S230). The current second frame count Fb is 6. In an embodiment, as illustrated in FIGS. 17A and 17B, since the next masking change frame Fm stored in the memory MEM is 20, Fb is not equal to Fm.

The process proceeds to operation S250, and the boundary controller 120 increases the first frame count Fa by one and increases the second frame count Fb by one.

In this manner, the boundary controller 120 repeatedly performs operation S220 to operation S290.

Since Fb=Fm in the 20-th frame, the boundary controller 120 sets the frame number Fn to a value corresponding to the masking change frame Fm stored in the memory MEM (S240). In an embodiment, as illustrated in FIGS. 17A and 17B, since the frame number corresponding to the masking change frame (Fm=20) stored in the memory MEM, i.e., the 20-th frame, is 7, Fn=7.

Therefore, in the 20-th to 26th frames, three horizontal lines Lk+1 to Lk+3 are driven (D), and the other 13 horizontal lines Lk+4 to Lk+16 are masked (M).

According to an embodiment of the driving method illustrated in FIGS. 17A, 17B, and 18, a portion of the 16 horizontal lines Lk+1 to Lk+16 may be driven (D) and another portion may be masked (M) from the second frame to the 60-th frame.

In such an embodiment, each of H horizontal lines Lk+1 to Lk+H may be masked (M) during M frames among A frames and may be driven (D) during (A-M) frames. For example, the (k+1)-th horizontal line Lk+1 is masked (M) in each of six frames (second to seventh frames) among 59 frames and is driven (D) in each of 53 frames (eighth to 60-th frames).

In such an embodiment, as illustrated in FIGS. 17A and 17B, since the M frames included in the frame blocks FB1 to FB17 are nonlinearly set, the driving frequency of each of the (k+1)-th to (k+16)-th horizontal lines Lk+1 to Lk+16 may nonlinearly decrease. In such an embodiment, a frequency difference between horizontal lines located away from the first display region DA1 may be minutely adjusted.

In one embodiment, for example, the frequency difference between the (k+1)-th and (k+2)-th horizontal lines Lk+1 and Lk+2 is 6 Hz, and the frequency difference between the (k+2)-th and (k+3)-th horizontal lines Lk+2 and Lk+3 is 6 Hz. In such an embodiment, the frequency difference between the (k+14)-th and (k+15)-th horizontal lines Lk+14 and Lk+15 is 1 Hz, and the frequency difference between the (k+15)-th and (k+16)-th horizontal lines Lk+15 and Lk+16 is 1 Hz. Therefore, as described above with reference to FIG. 16, the brightness may gradually change in the boundary region BR. When the brightness gradually changes in the boundary region BR, user's recognition of a brightness difference may be minimized.

When the mode signal MD output from the frequency mode determination part 110 indicates the multi-frequency mode, the process returns to operation S200 (S300). If the mode signal MD output from the frequency mode determination part 110 does not indicate the multi-frequency mode (i.e., changes to the normal mode), the boundary controller 120 stops outputting the boundary masking signal BMS.

In an embodiment, as illustrated in FIGS. 14A and 14B, the memory MEM stores, for each frame block, the frame number Fn for the second to 60-th frames corresponding to the boundary region BR. In one embodiment, for example, when the frame number Fn is expressed in 4 bits, 4 bits×60 frames, i.e., information of total 240 bits may be stored in the memory MEM.

In an alternative embodiment, as illustrated in FIGS. 17A and 17B, the memory MEM stores the masking change frame Fm of a location in which the frame number Fn changes among the second to 60-th frames corresponding to the boundary region BR and the frame number Fn corresponding to the masking change frame Fm. In one embodiment, for example, when the frame number Fn is expressed in 4 bits and the masking change frame Fm is expressed in 7 bits, (4 bits+7 bits)×6, i.e., information of only 66 bits may be stored in the memory MEM.

For convenience of illustration, FIGS. 17A and 17B illustrate that the frame numbers Fn and the masking change frames Fm in the memory MEM are arranged in alignment with corresponding frame locations, but the frame numbers Fn and the masking change frames Fm may be consecutively stored in the memory MEM.

Figure 19B:
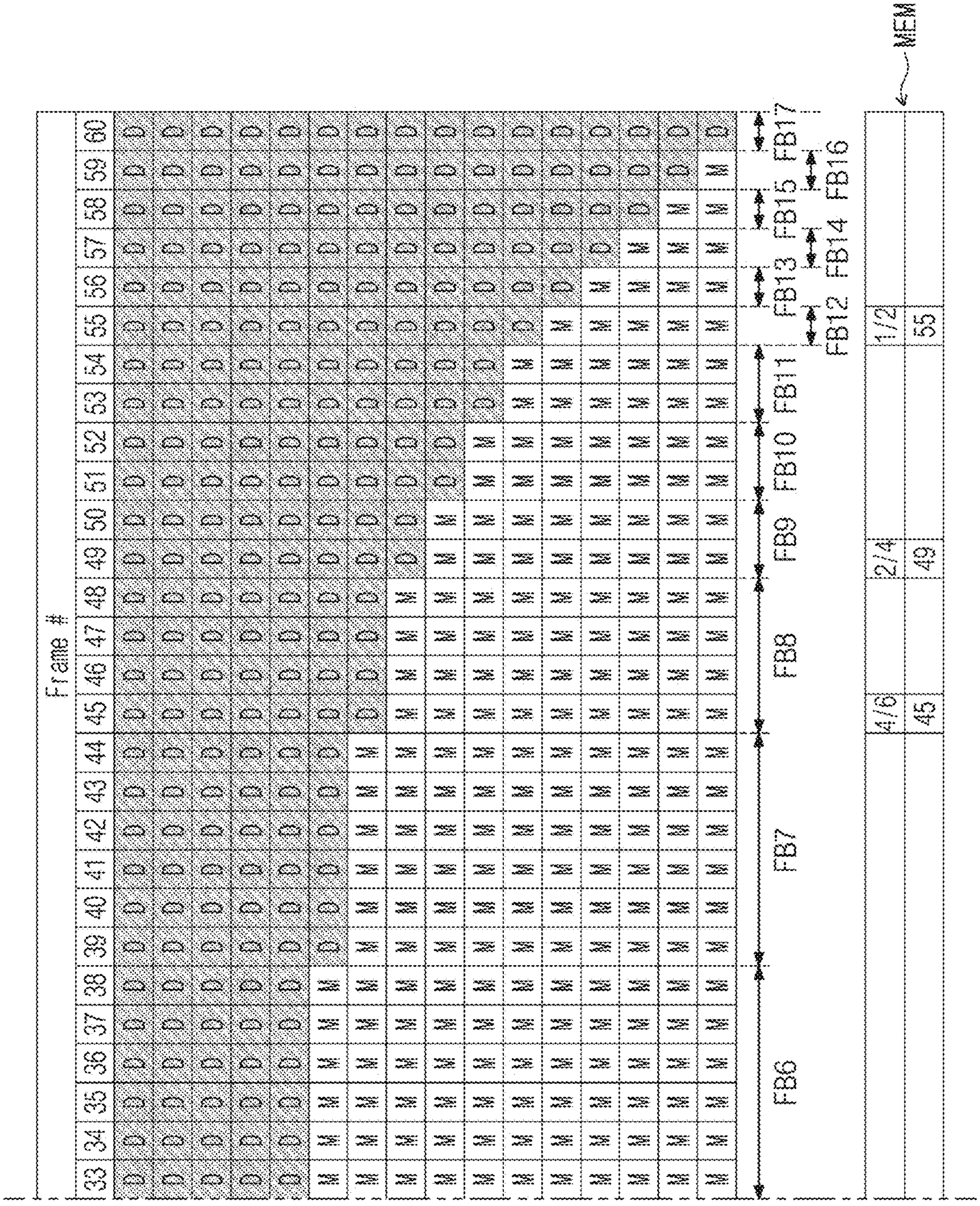

FIGS. 19A and 19B are diagrams illustrating another alternative embodiment of a method of driving horizontal lines of a boundary region BR.

The embodiment of the method of driving horizontal lines of a boundary region BR, illustrated in FIGS. 19A and 19B, are similar to the embodiment of the method described above with reference to FIGS. 17A and 17B.

In an embodiment, as illustrated in FIGS. 19A and 19B, the memory MEM may store an initialization value INT, an acceleration factor AF, and the masking change frame Fm (i.e., FM in FIG. 19A) indicating a location in which the acceleration factor AF is changed.

The acceleration factor AF may be expressed as a ratio between the number of previous frames and the number of current frames. In one embodiment, for example, the initialization value INT may be 6. The initialization value INT may represent an increasing rate of masked (M) lines in the boundary region BR (see FIG. 9). When the initialization value INT is 6, the line increasing rate is 6. The boundary controller 120 increase the number of masked (M) lines by 6 every six frames. In one embodiment, for example, the number of lines masked (M) during the second to seventh frames is 6, the number of lines masked (M) during the eighth to 13-th frames is 12, and the number of lines masked (M) during the 14-th to 19-th frames is 18.

When the next masking change frame Fm is the 20-th frame, the boundary controller 120 may determine the changed line increasing rate on the basis of the acceleration factor AF and the previous line increasing rate. In one embodiment, for example, when the previous line increasing rate is 6, and the acceleration factor AF is 7/6, the changed line increasing rate is 6×7/6, i.e., 7. Therefore, the number of lines masked (M) during the 20-th to 26-th frames is 25.

When the next masking change frame Fm is the 27-th frame, the boundary controller 120 may determine the changed line increasing rate on the basis of the acceleration factor AF and the previous line increasing rate. For example, when the previous line increasing rate is 7, and the acceleration factor AF is 6/7, the changed line increasing rate is 7×6/7, i.e., 6. Therefore, the number of lines masked (M) during the 27-th to 32-nd frames is 31, the number of lines masked (M) during the 33rd to 38-th frames is 37, and the number of lines masked (M) during the 39-th to 44-th frames is 43.

When the next masking change frame Fm is the 45th frame, the boundary controller 120 may determine the changed line increasing rate on the basis of the acceleration factor AF and the previous line increasing rate. In one embodiment, for example, when the previous line increasing rate is 6, and the acceleration factor AF is 4/6, the changed line increasing rate is 6×4/6, i.e., 4. Therefore, the number of lines masked (M) during the 45-th to 48-th frames is 47.

When the next masking change frame Fm is the 49-th frame, the boundary controller 120 may determine the changed line increasing rate on the basis of the acceleration factor AF and the previous line increasing rate. In one embodiment, for example, when the previous line increasing rate is 4, and the acceleration factor AF is 2/4, the changed line increasing rate is 4×2/4, i.e., 2. Therefore, the number of lines masked (M) during the 49-th and 50-th frames is 49, the number of lines masked (M) during the 51-st and 52-nd frames is 51, and the number of lines masked (M) during the 53-rd and 54-th frames is 53.

When the next masking change frame Fm is the 55th frame, the boundary controller 120 may determine the changed line increasing rate on the basis of the acceleration factor AF and the previous line increasing rate. In one embodiment, for example, when the previous line increasing rate is 2, and the acceleration factor AF is ½, the changed line increasing rate is 2×½, i.e., 1. Therefore, the numbers of lines masked (M) during the 55-th to 60-th frames are 54, 56, 57, 58, and 59 respectively.

In an embodiment, as illustrated in FIGS. 19A and 19B, the memory MEM stores the initialization value INT, the masking change frame Fm of a location in which the frame number Fn changes among the second to 60-th frames corresponding to the boundary region BR, and the frame number Fn corresponding to the masking change frame Fm. Therefore, a frequency for each of the (k+1)-th to (k+16)-th horizontal lines Lk+1 to Lk+16 of the boundary region BR may be set using minimum data.

For convenience of illustration, FIGS. 19A and 19B illustrate that the initialization value INT, the acceleration factors AF, and the masking change frames Fm in the memory MEM are arranged in alignment with corresponding frame locations, but the initialization value INT, the acceleration factors AF and the masking change frames Fm may be consecutively stored in the memory MEM.

In embodiments of the invention, as described herein, a display device may operate in a multi-frequency mode in which a first display region is driven at a first driving frequency and a second display region is driven at a second driving frequency when a moving image is displayed in the first display region and a still image is displayed in the second display region. In the multi-frequency mode, a driving frequency for a boundary region, which is adjacent to the first display region, in the second display region may be set to a third driving frequency that is lower than the first driving frequency and higher than the second driving frequency. In such embodiments, deterioration of display quality may be prevented by setting a third driving frequency so that a brightness difference due to afterimage may not be recognized in the boundary region.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A driving controller comprising:

a controller which receives an image signal and a control signal, and outputs a data control signal and a scan control signal, wherein the controller which divides a display panel into a first display region, a second display region and a boundary region, outputs data control signal and the scan control signal to drive the first display region at a first driving frequency, to drive the second display region at a second driving frequency lower than the first driving frequency and to drive the boundary region at a plurality of third driving frequencies during a multi-frequency mode, and sets the plurality of third driving frequencies respectively corresponding to a plurality of horizontal lines in the boundary region during the multi-frequency mode, wherein the plurality of third driving frequencies corresponding to the plurality of horizontal lines have different frequency levels, wherein the boundary region is defined between the first display region and the second display region, wherein the boundary region includes H horizontal lines including a first horizontal line to an H-th horizontal line sequentially arranged from a position adjacent to the first display region, wherein H is a natural number, and wherein the controller drives or masks each of the H horizontal lines every A frames during the multi-frequency mode, wherein A is a natural number.

2. The driving controller of claim 1, wherein frequency levels of the plurality of third driving frequencies nonlinearly decreases from the first horizontal line to the H-th horizontal line.

3. The driving controller of claim 1, wherein a difference between the third driving frequencies corresponding to first and second horizontal lines among the plurality of horizontal lines is higher than a difference between the third driving frequencies corresponding to (H−1)-th and H-th horizontal lines among the plurality of horizontal lines.

4. The driving controller of claim 1, wherein the driving controller masks each of the H horizontal lines during M frames among the A frames, and drives each of the H horizontal lines during (A-M) frames, wherein M is a natural number less than A.

5. The driving controller of claim 4, wherein a value of M nonlinearly increases from the first horizontal line to the H-th horizontal line.

6. The driving controller of claim 5, wherein a number of masked frames of the first horizontal line among the H horizontal lines is greater than a number of masked frames of the H-th horizontal line.

7. The driving controller of claim 4, wherein the controller comprises:

a frequency mode determiner which determines an operation mode based on the image signal and the control signal, and outputs a mode signal;

a boundary controller which outputs a boundary masking signal when the mode signal indicates the multi-frequency mode; and a signal generator which outputs the data control signal and the scan control signal based on the image signal, the control signal, the mode signal, and the boundary masking signal.

8. The driving controller of claim 7, wherein the boundary controller comprises a memory which defines, as a frame block, M consecutive frames in the H horizontal lines, and store a value of M corresponding to each fame block.

9. The driving controller of claim 8, wherein the boundary controller comprises a memory which defines, as a frame block, M consecutive frames in the H horizontal lines, and store a value of M and a mask change frame indicating a frame block location in which the value of M is changed.

10. The driving controller of claim 8, wherein the boundary controller comprises a memory which defines, as a frame block, M consecutive frames in the H horizontal lines, and store a mask change frame indicating a frame block location in which a value of M is changed and an acceleration factor indicating a ratio between a previous value of M and a current value of M at the frame block location.

11. A display device comprising:

a display panel comprising a plurality of pixels connected to a plurality of data lines and a plurality of scan lines;

a data driving circuit which drives the plurality of data lines;

a scan driving circuit which drives the plurality of scan lines; and a driving controller which divides the display panel into a first display region, a second display region and a boundary region, controls the data driving circuit and the scan driving circuit to drive the first display region at a first driving frequency, to drive the second display region at a second driving frequency different from the first driving frequency and to drive the boundary region at a plurality of third driving frequencies during a multi-frequency mode, and sets the plurality of third driving frequencies respectively corresponding to a plurality of horizontal lines in the boundary region during the multi-frequency mode, wherein the boundary region is defined between the first display region and the second display region, wherein the boundary region includes H horizontal lines including a first horizontal line to an H-th horizontal line sequentially arranged from a position adjacent to the first display region, wherein H is a natural number, and wherein frequency levels of the plurality of third driving frequencies nonlinearly changes from the first horizontal line to the H-th horizontal line.

12. The display device of claim 11, wherein frequency levels of the plurality of third driving frequencies nonlinearly decreases from the first horizontal line to the H-th horizontal line.

13. The display device of claim 12, wherein the driving controller masks each of the H horizontal lines during M frames among the A frames, and drives each of the H horizontal lines during (A-M) frames, wherein M is a natural number less than A.

14. The display device of claim 13, wherein a value of M nonlinearly increases from the first horizontal line to the H-th horizontal line.

15. The display device of claim 13, wherein a number of masked frames of the first horizontal line among the H horizontal lines is greater than a number of masked frames of the H-th horizontal line.

16. A method of driving a display device, the method comprising:

dividing a display panel of the display device into a first display region, a second display region and a boundary region during a multi-frequency mode, and driving the first display region at a first driving frequency and driving the second display region at a second driving frequency different from the first driving frequency during a multi-frequency mode; and setting a plurality of third driving frequencies respectively corresponding to a plurality of horizontal lines in the boundary region, wherein the boundary region is defined between the first display region and the second display region, wherein the boundary region includes H horizontal lines including a first horizontal line to an H-th horizontal line sequentially arranged from a position adjacent to the first display region, wherein H is a natural number, and wherein frequency levels of the plurality of third driving frequencies nonlinearly changes from the first horizontal line to the H-th horizontal line.

17. The method of claim 16, wherein the frequency levels of the plurality of third driving frequencies nonlinearly decreases from the first horizontal line to the H-th horizontal line.

18. The method of claim 16, wherein the setting the plurality of third driving frequencies respectively corresponding to the plurality of horizontal lines in the boundary region comprises masking each of the H horizontal lines during M frames among A frames, and driving each of the H horizontal lines during (A-M) frames among the A frames, wherein M is a natural number, and A is a natural number greater than M.

19. The method of claim 18, wherein a value of M nonlinearly increases from the first horizontal line to the H-th horizontal line.

* * * * *